US012609452B2

(12) United States Patent
Ueda et al.

(10) Patent No.: US 12,609,452 B2
(45) Date of Patent: Apr. 21, 2026

(54) ANTENNA DEVICE AND COMMUNICATION MODULE

(71) Applicant: Murata Manufacturing Co., Ltd., Nagaokakyo (JP)

(72) Inventors: Hideki Ueda, Nagaokakyo (JP); Kaoru Sudo, Nagaokakyo (JP); Natsumi Minamitani, Nagaokakyo (JP); Jun Adachi, Nagaokakyo (JP); Shu Hamada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 113 days.

(21) Appl. No.: 18/409,842

(22) Filed: Jan. 11, 2024

(65) Prior Publication Data

US 2024/0145926 A1 May 2, 2024

Related U.S. Application Data

(63) Continuation of application No. PCT/JP2022/026008, filed on Jun. 29, 2022.

(30) Foreign Application Priority Data

Jul. 12, 2021 (JP) ................................ 2021-115071

(51) Int. Cl.
*H01Q 9/04* (2006.01)

(52) U.S. Cl.
CPC ........... *H01Q 9/0471* (2013.01); *H01Q 9/045* (2013.01)

(58) Field of Classification Search
CPC .... H01Q 9/0471; H01Q 9/045; H01Q 1/2283; H01Q 9/0407; H01Q 9/0421;
(Continued)

(56) References Cited

U.S. PATENT DOCUMENTS 6,501,427 B1 * 12/2002 Lilly .................... H01Q 21/245 333/33
9,825,373 B1 * 11/2017 Smith ................ H01Q 21/0006
(Continued)

FOREIGN PATENT DOCUMENTS

JP H05-095225 A 4/1993
JP 2001-313511 A 11/2001
(Continued)

OTHER PUBLICATIONS

International Search Report and Written Opinion mailed on Oct. 4, 2022, received for PCT Application PCT/JP2022/026008, filed on Jun. 29, 2022, 9 pages including English Translation.

*Primary Examiner* — Dameon E Levi
*Assistant Examiner* — Jordan E. DeWitt
(74) *Attorney, Agent, or Firm* — XSENSUS LLP

(57) ABSTRACT

A dielectric block includes a bottom surface that includes a conductive ground member including an antenna ground surface inclined with respect to the bottom surface. A feed element is disposed at a distance from the antenna ground surface, and constitutes a patch antenna together with the antenna ground surface. A feed line is connected to a feed point of the feed element, and a dielectric member that supports the feed element with respect to the ground member. The ground member is exposed to the bottom surface, on both a lower side and a higher side of a contour line passing through an intersection point of a perpendicular line from the feed point to a virtual plane including the bottom surface and a plane including the antenna ground surface, using the bottom surface as a height reference.

19 Claims, 27 Drawing Sheets

(58) Field of Classification Search
CPC ...... H01Q 21/065; H01Q 21/08; H01Q 13/08; H01Q 9/04; H01Q 9/0485
See application file for complete search history.

(56) References Cited

U.S. PATENT DOCUMENTS

| | | | | |
|---|---|---|---|---|
| 2004/0155821 | A1* | 8/2004 | Ohara | H01Q 9/0407 343/700 MS |
| 2004/0227670 | A1* | 11/2004 | Higasa | H01Q 9/0435 343/846 |
| 2004/0239567 | A1* | 12/2004 | Van Der Poel | H01Q 21/24 343/700 MS |
| 2006/0092080 | A1* | 5/2006 | Lee | H01Q 9/0471 343/700 MS |
| 2008/0204326 | A1* | 8/2008 | Zeinolabedin Rafi | H01Q 9/0428 343/700 MS |
| 2011/0057853 | A1* | 3/2011 | Kim | H01Q 9/0442 343/846 |
| 2013/0307732 | A1* | 11/2013 | Chiu | H01Q 9/0421 343/700 MS |
| 2015/0207233 | A1* | 7/2015 | Kim | H01Q 9/0485 343/785 |
| 2018/0358701 | A1* | 12/2018 | Gimersky | H01Q 9/0414 |
| 2019/0027808 | A1* | 1/2019 | Mow | H04R 5/04 |
| 2019/0140356 | A1* | 5/2019 | Mohan | H01Q 13/0208 |
| 2019/0379134 | A1* | 12/2019 | Paulotto | H01Q 21/062 |
| 2020/0021022 | A1* | 1/2020 | Awaji | H01Q 1/243 |
| 2020/0303821 | A1* | 9/2020 | Lee | H01Q 5/335 |
| 2020/0328530 | A1* | 10/2020 | Park | H01Q 1/2283 |
| 2021/0066788 | A1* | 3/2021 | Kim | H01Q 1/38 |
| 2021/0135364 | A1* | 5/2021 | Yamada | H01Q 9/045 |
| 2022/0013911 | A1* | 1/2022 | Lee | H01Q 9/0414 |
| 2022/0077584 | A1* | 3/2022 | Kwak | H01Q 5/40 |
| 2022/0158359 | A1* | 5/2022 | Lee | H01Q 21/08 |
| 2024/0145926 | A1* | 5/2024 | Ueda | H01Q 21/065 |
| 2024/0170847 | A1* | 5/2024 | Eshrah | H01Q 9/045 |
| 2025/0030166 | A1* | 1/2025 | Kubwimana | H01Q 1/364 |

FOREIGN PATENT DOCUMENTS

| | | | |
|---|---|---|---|
| JP | 2004-235729 | A | 8/2004 |
| JP | 2005-094312 | A | 4/2005 |
| JP | 2007-067784 | A | 3/2007 |
| JP | 2007-288398 | A | 11/2007 |
| JP | 2020-068430 | A | 4/2020 |
| WO | 2019/082447 | A1 | 5/2019 |

* cited by examiner

ANTENNA DEVICE AND COMMUNICATION MODULE

CROSS-REFERENCE TO RELATED APPLICATIONS

This application is a continuation of international application no. PCT/JP2022/026008, filed Jun. 29, 2022, and which claims priority to Japanese application no. JP 2021-115071, filed Jul. 12, 2021. The entire contents of both prior applications are hereby incorporated by reference.

TECHNICAL FIELD

The present disclosure relates to an antenna device and a communication module.

BACKGROUND ART

An antenna device that can freely control the maximum gain angle of a directivity pattern includes a radiating element (feed element) and an antenna ground (ground electrode) that are held by a dielectric. The dielectric is mounted on a circuit substrate such that the feed element and the ground electrode form a predetermined inclination angle with respect to the circuit substrate.

CITATION LIST

Patent Document

Patent Document 1: Japanese Unexamined Patent Application Publication No. 2004-235729

SUMMARY

Technical Problem

According to the simulation experiments of the inventors of the present disclosure, it is found that even if the feed element and the ground electrode are inclined in a direction in which the maximum gain is desired, a direction in which the maximum gain is to be obtained is not sufficiently inclined in the desired direction, in some cases. Thus, aspects of the present disclosure is to provide an antenna device and a communication module in which a direction in which the maximum gain is to be obtained can be inclined in a desired direction.

Solution to Problem

According to an aspect of the present disclosure, there is provided an antenna device including: a dielectric block including a bottom surface, in which the dielectric block includes a conductive ground member including an antenna ground surface inclined with respect to the bottom surface, a feed element that is disposed at a distance from the antenna ground surface, and constitutes a patch antenna together with the antenna ground surface, a feed line connected to a feed point of the feed element, and a dielectric member that supports the feed element with respect to the ground member, and the ground member is exposed to the bottom surface, on both a lower side and a higher side of a contour line passing through an intersection point of a perpendicular line drawn from the feed point to a virtual plane including the bottom surface and a plane including the antenna ground surface, by using the bottom surface as a height reference.

According to another aspect of the present disclosure, there is provided a communication module including: the antenna device; and a substrate including a substrate ground surface, in which the dielectric block is mounted on the substrate in a posture in which the bottom surface faces the substrate, a part of the ground member, exposed to the bottom surface is electrically connected to the substrate ground surface, and the communication module further includes: a circuit element supported by the substrate and accommodated in the recess portion.

According to still another aspect of the present disclosure, there is provided an antenna device including: a dielectric member including a bottom surface and a side surface; a conductive ground member that is provided at the dielectric member and includes an antenna ground surface inclined with respect to the bottom surface; a feed element that is provided at the dielectric member, is disposed at a distance from the antenna ground surface, and constitutes a patch antenna together with the antenna ground surface; and a feed line connected to a feed point of the feed element, in which the ground member is exposed to the bottom surface or the side surface, on both a lower side and a higher side of a contour line passing through an intersection point of a perpendicular line drawn from the feed point to a virtual plane including the bottom surface and a plane including the antenna ground surface, by using the bottom surface as a height reference.

Advantageous Effects

By connecting a region of the ground member, exposed to the bottom surface to a ground of a mounting substrate, a ground potential of the antenna ground surface is stabilized. Thus, a direction in which the maximum gain is to be obtained can be inclined in a desired direction by following the inclination of the antenna ground surface.

DESCRIPTION OF EMBODIMENTS

First Example

Figure 1A:
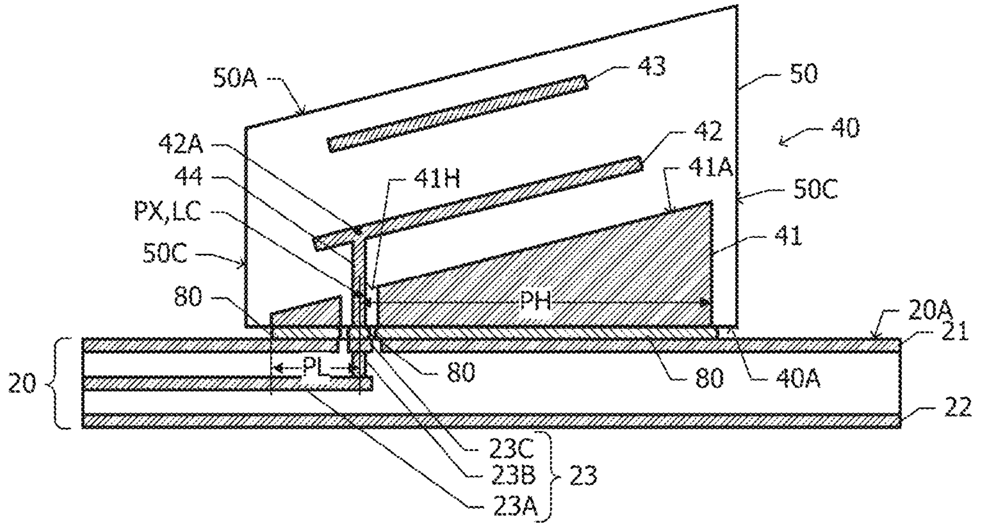
FIG. 1A is a cross-sectional diagram of an antenna device according to a first example.
Figure 1B:
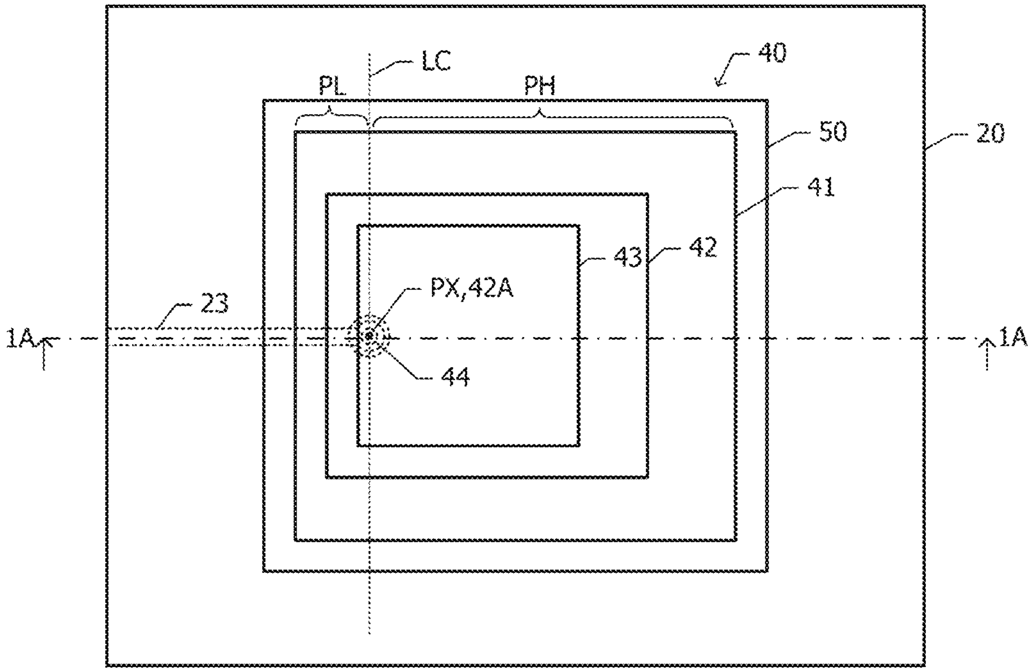
FIG. 1B is a plan view of the antenna device according to the first example.

An antenna device according to a first example will be described with reference to FIGS. 1A to 3C. FIGS. 1A and 1B are a cross-sectional diagram and a plan view of the antenna device according to the first example, respectively. A cross-sectional diagram taken along a dashed-dotted line 1A-1A in FIG. 1B corresponds to FIG. 1A.

A dielectric block 40 is mounted on a substrate 20. The substrate 20 includes a first ground conductor 21 disposed at one surface, a second ground conductor 22 disposed at the other surface, and a feed line 23. A surface of the first ground conductor 21 is referred to as a substrate ground surface 20A. The feed line 23 includes a strip line 23A, a via-conductor 23B, and a land 23C. The strip line 23A is disposed between the first ground conductor 21 and the second ground conductor 22, and the land 23C is disposed at an opening provided in the first ground conductor 21. The via-conductor 23B connects the strip line 23A and the land 23C.

As the substrate 20, a low-temperature co-fired ceramic multilayer substrate (LTCC substrate), a multilayer resin substrate, a ceramic multilayer substrate other than low-temperature co-fired ceramics, and the like can be used. Examples of the resin material of the multilayer resin substrate include a resin such as epoxy or polyimide, a liquid crystal polymer having a low dielectric constant, a fluororesin, and the like. The first ground conductor 21, the second ground conductor 22, the strip line 23A, the via-conductor 23B, and the land 23C are formed of a metal such as Al, Cu, Au, and Ag, or an alloy having these metals as main components.

The dielectric block 40 includes a ground member 41, a feed element 42, a parasitic element 43, a feed line 44, and a dielectric member 50. Further, the dielectric block 40 has a bottom surface 40A facing the substrate 20. The ground member 41, the feed element 42, the parasitic element 43, and the feed line 44 are formed of a conductive material, for example, a metal such as Al, Cu, Au, and Ag, or an alloy having these metals as main components. The ground member 41 is exposed to the bottom surface 40A of the dielectric block 40, and is connected to and fixed to the substrate ground surface 20A with a solder layer 80 interposed therebetween. The ground member 41 has an antenna ground surface 41A inclined with respect to the substrate ground surface 20A. The antenna ground surface 41A faces a side opposite to the substrate 20 side.

The feed element 42 is a plate-shaped conductive member disposed at a distance from the antenna ground surface 41A and disposed parallel to the antenna ground surface 41A. The feed element 42 constitutes a patch antenna together with the antenna ground surface 41A.

The parasitic element 43 is disposed at a distance from the feed element 42, and the parasitic element 43 is loaded on the feed element 42. The stacked patch antenna is configured with the antenna ground surface 41A, the feed element 42, and the parasitic element 43. The parasitic element 43 may be omitted.

The feed line 44 is connected to a feed point 42A of the feed element 42. The feed line 44 from the feed point 42A, intersects the antenna ground surface 41A, and extends toward the bottom surface 40A of the dielectric block 40 through a through-hole 41H provided in the ground member 41. Insulation between the feed line 44 and the antenna ground surface 41A is ensured at an intersection location between the feed line 44 and the antenna ground surface 41A. That is, the ground member 41 includes a part that surrounds the feed line 44 between the bottom surface 40A of the dielectric block 40 and the antenna ground surface 41A. A tip of the feed line 44 is exposed to the bottom surface 40A of the dielectric block 40, and is connected to the land 23C of the substrate 20 with another solder layer 80 interposed therebetween.

The dielectric member 50 supports the feed element 42, the parasitic element 43, and the feed line 44 with respect to the ground member 41, and fixes a relative positional relationship thereof. The dielectric member 50 has an inclined surface 50A parallel to the antenna ground surface 41A and a side surface 50C substantially vertical to the bottom surface 40A of the dielectric block 40. The inclined surface 50A is continuous with the side surface 50C over an entire outer periphery of the inclined surface 50A. When the antenna ground surface 41A is viewed in a plan view, the feed element 42 is included in the inclined surface 50A. Further, when the antenna ground surface 41A is viewed in the plan view, the parasitic element 43 is included in the feed element 42, and the feed element 42 is included in the antenna ground surface 41A.

A perpendicular line drawn from the feed point 42A to a virtual plane including the bottom surface 40A of the dielectric block 40 intersects a virtual plane including the antenna ground surface 41A. The intersection point is labeled as PX. With the bottom surface 40A of the dielectric block 40 as a height reference, a contour line on the virtual plane including the antenna ground surface 41A passing through the intersection point PX is labeled as LC. Here, the "contour line" means a line that connects points having the same height from the bottom surface 40A on the virtual plane including the antenna ground surface 41A. When the bottom surface 40A of the dielectric block 40 is viewed in the plan view, the ground member 41 is exposed to the bottom surface 40A of the dielectric block 40, on both a lower side PL and a higher side PH of the contour line LC. That is, the antenna ground surface 41A is connected to the substrate ground surface 20A with the ground member 41 interposed therebetween, on both the lower side PL and the higher side PH of the contour line LC. Here, "the antenna ground surface 41A is connected to the substrate ground surface 20A with the ground member 41 interposed therebetween" means that the ground member 41 has a conductive path extending from the antenna ground surface 41A to the substrate ground surface 20A in a direction intersecting the antenna ground surface 41A. In particular, in the first example, since the ground member 41 is configured with a conductor lump, the antenna ground surface 41A is connected to the substrate ground surface 20A with the ground member 41 interposed therebetween over the entire region.

The dielectric block 40 of the antenna device according to the first example can be modeled by using, for example, a 3D printer.

Next, excellent effects of the first example will be described.

Since the antenna ground surface 41A and the feed element 42 are inclined with respect to the substrate ground surface 20A, a direction of a main beam is inclined with respect to the substrate ground surface 20A.

In general, the feed element 42 of the patch antenna has a size of approximately ½ of a wavelength of a radio wave in an operating frequency range. Since the antenna ground surface 41A is slightly larger than the feed element 42, the antenna ground surface 41A is larger than half the wavelength of the radio wave in the operating frequency range. In a case where the antenna ground surface 41A is connected to the substrate ground surface 20A only at the lowermost end of the antenna ground surface 41A, a potential difference corresponding to a phase difference of 180° or more can be generated between the uppermost end and the lowermost end of the antenna ground surface 41A.

In the first example, the ground member 41 is exposed to the bottom surface 40A of the dielectric block 40, on both the lower side PL and the higher side PH of the contour line LC, and the exposed region is connected to the substrate ground surface 20A with the solder layer 80 interposed therebetween. With this configuration, a ground potential of the antenna ground surface 41A is stabilized, as compared with a configuration in which the antenna ground surface 41A is connected to the substrate ground surface 20A only at the lowermost end of the antenna ground surface 41A. Here, "the ground potential is stabilized" means that a potential of the antenna ground surface 41A approaches a potential of the substrate ground surface 20A over the entire region. In particular, in the first example, since the entire region of the antenna ground surface 41A is connected to the substrate ground surface 20A with the ground member 41 interposed therebetween, a high effect of stabilizing the ground potential of the antenna ground surface 41A is obtained. By stabilizing the ground potential of the antenna ground surface 41A, an excellent effect is obtained that directivity control of the antenna device is easy.

Further, in the first example, the feed line 44 passes through the through-hole 41H provided in the ground member 41. That is, the feed line 44 is surrounded by the ground member 41. Therefore, it is possible to manage an impedance of the feed line 44. For example, a characteristic impedance of the feed line 44 in the dielectric block 40 can be matched to a characteristic impedance of the feed line 23 in the substrate 20.

Next, impedance management and radiation characteristics of the feed line of the antenna device according to the first example will be described with reference to FIGS. 2A to 3C.

A simulation is performed on a reflection coefficient S11, an angular dependence of a realized gain, and a realized peak gain of the antenna device according to the first example and an antenna device according to a comparative example.

Figure 2A:
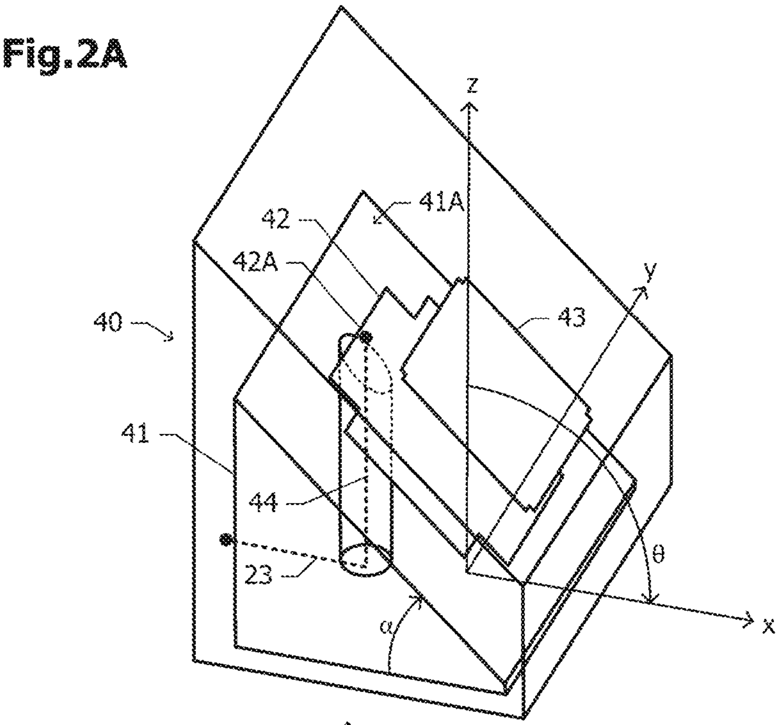
FIG. 2A is a perspective view of the antenna device according to the first example as a simulation target.
Figure 2B:
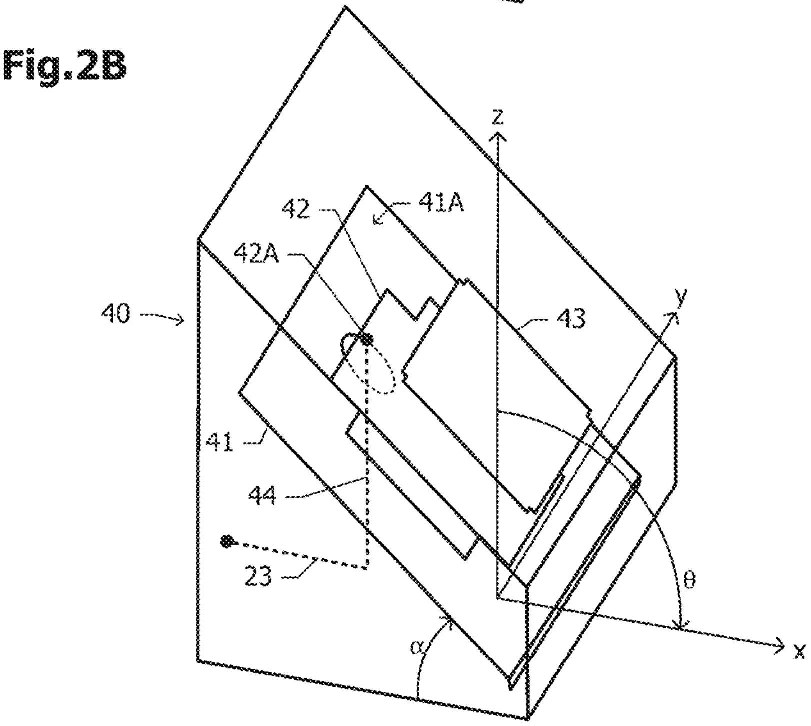
FIG. 2B is a perspective view of an antenna device according to a comparative example as the simulation target.

FIGS. 2A and 2B are perspective views of the antenna devices according to the first example and the comparative example as simulation targets, respectively. The feed element 42 and the parasitic element 43 have a shape in which four corners of a square are notched in square shapes. In the antenna device (FIG. 2B) according to the comparative example, the antenna ground surface 41A is connected to the substrate ground surface 20A (not illustrated in FIGS. 2A and 2B) only at a lower end of the antenna ground surface 41A.

An xyz orthogonal coordinate system with the bottom surface 40A of the dielectric block 40 as an xy plane is defined. A direction from the bottom surface 40A toward the feed element 42 is defined as a positive direction of a z-axis. An inclination direction of the antenna ground surface 41A is defined as an x-direction. An inclination angle α when an edge of the antenna ground surface 41A on a negative side of an x-axis is inclined to be lifted is defined as positive, and the inclination angle α when the edge on a positive side of the x-axis is inclined to be lifted is defined as negative. The feed point 42A is disposed at a position of the feed element 42 biased to the negative side of the x-axis. An angle inclined from the positive direction of the z-axis to the x-axis direction is defined as θ. The angle θ of inclination from the positive direction of the z-axis in the positive direction of the x-axis is defined as positive, and the angle θ of inclination in the negative direction of the x-axis is defined as negative.

The feed point 42A is provided on the negative side of the x-axis with respect to a geometric center of the feed element 42. That is, the feed line 44 becomes longer as the inclination angle α becomes larger in the positive direction. Conversely, as the inclination angle α becomes larger in the negative direction, the feed line 44 becomes shorter.

Figure 3A:
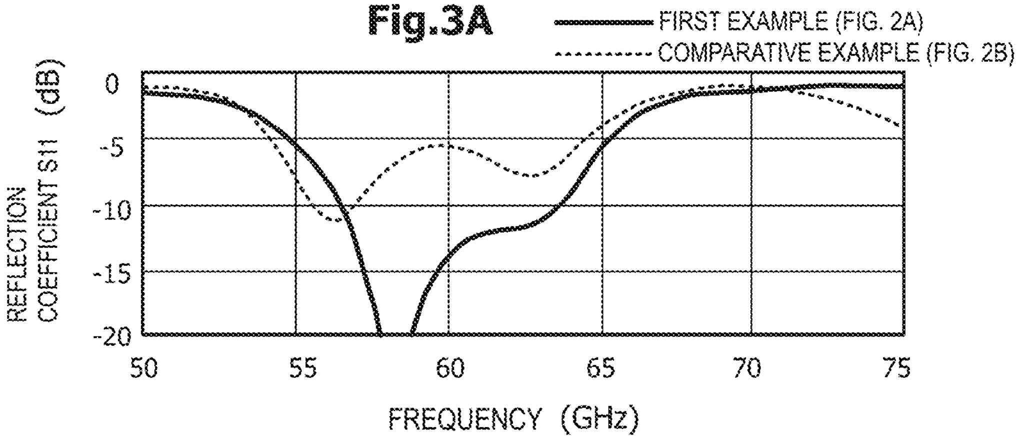
FIG. 3A is a graph illustrating a frequency dependence of a reflection coefficient S11.

FIG. 3A is a graph illustrating a frequency dependence of the reflection coefficient S11. A horizontal axis represents a frequency in a unit "GHz", and a vertical axis represents the reflection coefficient S11 in a unit "dB". A solid line and a broken line in FIG. 3A indicate the reflection coefficient S11 of the antenna devices according to the first example (FIG. 2A) and the comparative example (FIG. 2B), respectively. The inclination angle α is set to −45°.

In the antenna device according to the first example, it can be seen that the reflection coefficient S11 is equal to or less than −10 dB in a frequency band width of approximately 7 GHz centered on a frequency of 58 GHz. On the other hand, in the antenna device according to the comparative example, it can be seen that the reflection coefficient S11 is large and the impedance management is insufficient.

Figure 3B:
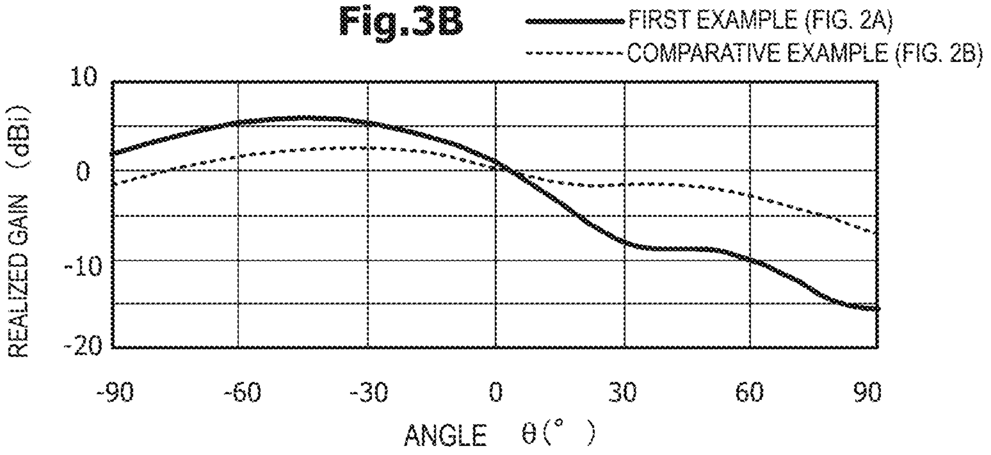
FIG. 3B is a graph illustrating a dependence of a realized gain on an angle θ.

FIG. 3B is a graph illustrating a dependency of a realized gain on the angle θ. A horizontal axis represents the angle θ in a unit "degree", and a vertical axis represents a realized gain in a unit "dBi". A solid line and a broken line in FIG. 3B indicate realized gains of the antenna devices according to the first example (FIG. 2A) and the comparative example (FIG. 2B), respectively. A frequency is 60 GHz, and the inclination angle α is −45°.

In the antenna device according to the first example, it can be seen that the realized gain indicates the maximum value at the angle θ=−45° and a direction of a main beam is inclined according to the inclination of the antenna ground surface 41A. On the other hand, in the antenna device according to the comparative example, it can be seen that the realized gain in a direction of 0=−45° is not higher than the realized gain of the first example even when the antenna ground surface 41A is inclined.

Figure 3C:
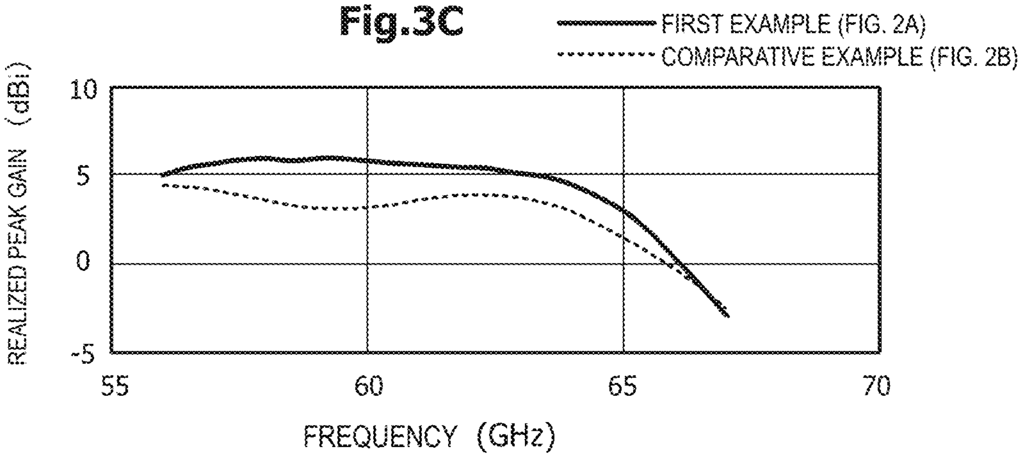
FIG. 3C is a graph illustrating a frequency dependence of a realized peak gain.

FIG. 3C is a graph illustrating a frequency dependence of a realized peak gain. A horizontal axis represents a frequency in a unit "GHz", and a vertical axis represents a realized peak gain in a unit "dBi". A solid line and a broken line in FIG. 3C indicate realized peak gains of the antenna devices according to the first example (FIG. 2A) and the comparative example (FIG. 2B), respectively. The inclination angle α is set to −45°.

It can be seen that a larger realized peak gain is obtained in the antenna device according to the first example than a realized peak gain of the antenna device according to the comparative example.

From the simulation results illustrated in FIGS. 3A, 3B, and 3C, it is checked that the impedance management can be easily performed, and the main beam can be directed in a desired direction by adopting the configuration of the antenna device according to the first example.

Second Example

Next, an antenna device according to a second example will be described with reference to FIGS. 4 to 8C. Hereinafter, a configuration in common with the antenna device according to the first example described with reference to FIGS. 1A to 3C will not be described.

In the antenna device (FIG. 1A) according to the first example, the inclined surface 50A of the dielectric member 50 is continuous with the side surface 50C over the entire outer periphery. On the other hand, in the antenna device according to the second example, the dielectric member 50 has a shape that is cut off at a top portion of the dielectric member 50 at a plane parallel to the substrate ground surface 20A. That is, the dielectric member 50 has a top surface 50B parallel to the substrate ground surface 20A. In the second example as well, when the antenna ground surface 41A is viewed in the plan view, the feed element 42 is included in the inclined surface 50A.

Next, excellent effects of the second example will be described.

In the same manner as the first example, in the second example as well, a ground potential of the antenna ground surface 41A is stabilized, so that an excellent effect is obtained that directivity control of the antenna device is easy. Further, in the same manner as the first example, it is possible to manage an impedance of the feed line 44.

Further, in the second example, a dimension of the dielectric block 40 in a height direction is reduced, as compared with the first example. Therefore, it is possible to reduce a thickness of the antenna device. Further, the dielectric block 40 can be mounted on the substrate 20 by sucking the top surface 50B with a chip mounter. Therefore, the dielectric block 40 can be easily mounted on the substrate 20.

In order to check the excellent effect of the antenna device according to the second example, a simulation of directional characteristics is performed. Next, the results of the simulation will be described with reference to FIGS. 5A to 6B. In the simulation, a frequency is set to 60 GHz, and a dimension of the dielectric block 40 is optimized at 60 GHz. The simulation is performed on the antenna devices according to the second example and the comparative example.

Figure 5A:
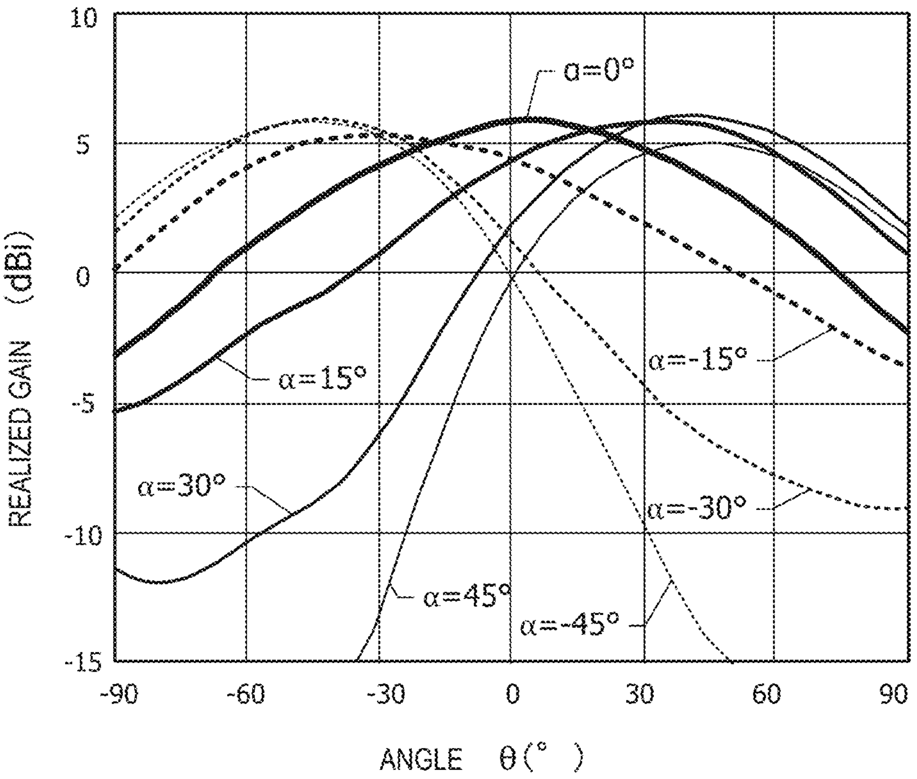
FIG. 5A is a graph illustrating a simulation result of directional characteristics of the antenna device according to the second example.
Figure 5B:
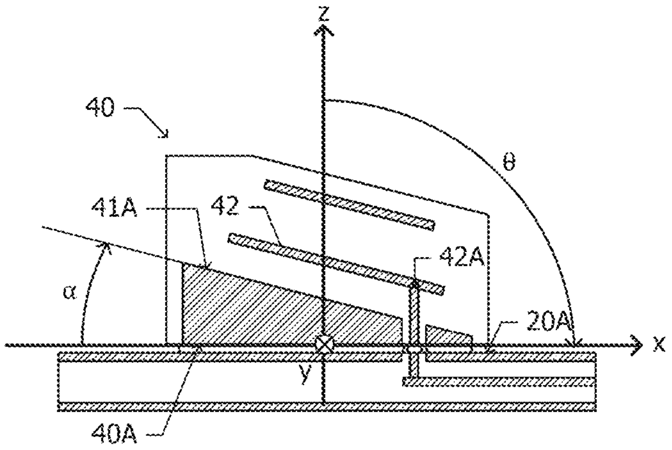
FIG. 5B is a diagram illustrating a coordinate system defined in the antenna device according to the second example.

FIG. 5A is a graph illustrating a simulation result of directional characteristics of the antenna device according to the second example, and FIG. 5B is a diagram illustrating a cross-sectional diagram and a coordinate system of the antenna device according to the second example. Definitions of an xyz orthogonal coordinate system, the angle θ, and the inclination angle α have the same manner as the definitions described with reference to FIGS. 2A and 2B. The feed point 42A is provided on a positive side of the x-axis with respect to a geometric center of the feed element 42. Therefore, the feed line 44 becomes shorter as the inclination angle α becomes larger in the positive direction. Conversely, as the inclination angle α becomes larger in the negative direction, the feed line 44 becomes longer.

A horizontal axis of FIG. 5A indicates the angle θ in a unit "degree", and a vertical axis indicates a realized gain in a unit "dBi". In a case where the inclination angle α is 0°, that is, when the antenna ground surface 41A and the bottom surface 40A of the dielectric block 40 are parallel to each other, the realized gain becomes maximum in a direction in which the angle θ is approximately 0°. As the inclination angle α is increased in the positive direction, the angle θ at which the realized gain becomes maximum is increased in the positive direction. Conversely, when the inclination angle α is increased in the negative direction, the angle θ at which the realized gain becomes maximum is increased in the negative direction. For example, the realized gain can be maximized in any direction in which the angle θ is in a range of −45° to +45°. That is, a main beam can be directed in any direction within a range of ±45° from a normal direction of the substrate ground surface 20A.

Figure 6A:
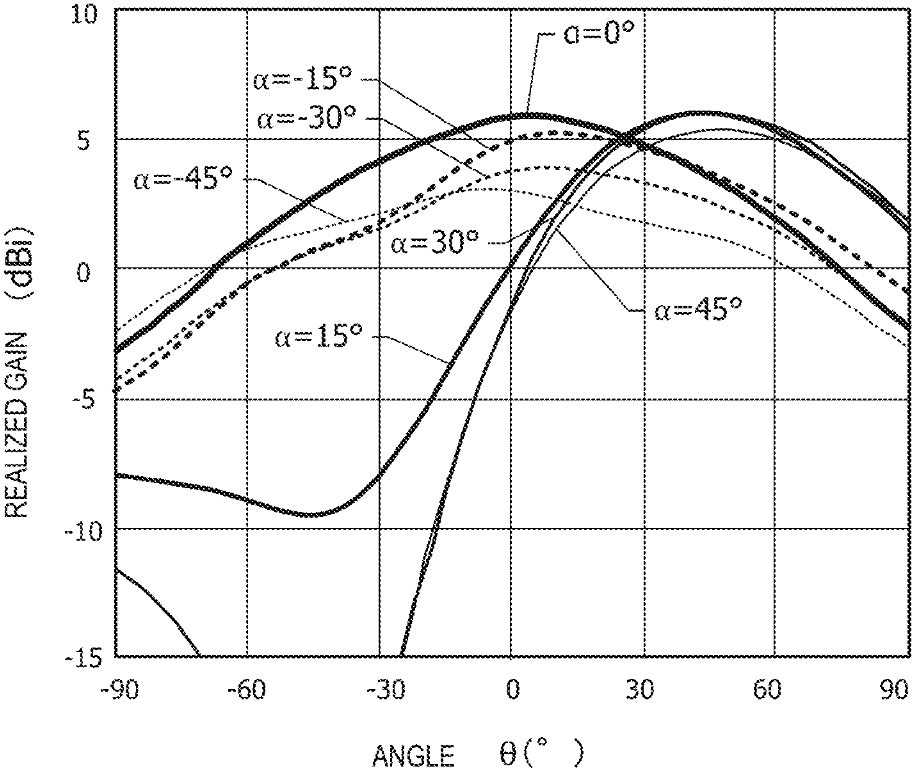
FIG. 6A is a graph illustrating a simulation result of directional characteristics of the antenna device according to the comparative example.
Figure 6B:
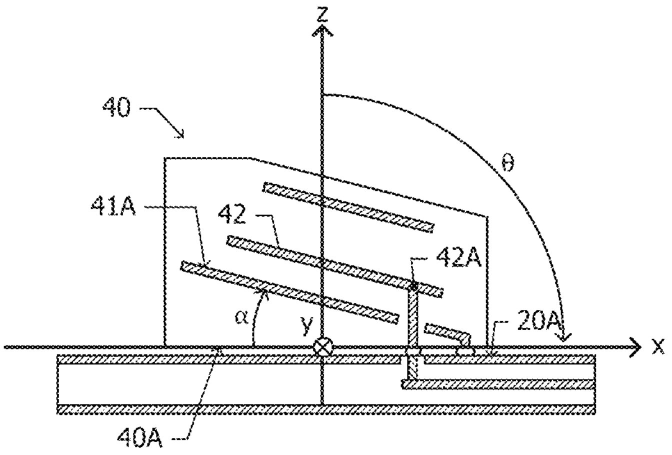
FIG. 6B is a diagram illustrating a coordinate system defined in the antenna device according to the comparative example.

FIG. 6A is a graph illustrating a simulation result of directional characteristics of the antenna device according to the comparative example, and FIG. 6B is a diagram illustrating a cross-sectional diagram and a coordinate system of the antenna device according to the comparative example.

In the comparative example, as illustrated in FIG. 6B, the antenna ground surface 41A is connected to the substrate ground surface 20A only at a lower end of the antenna ground surface 41A. That is, when the inclination angle α is positive, the antenna ground surface 41A is connected to the substrate ground surface 20A at an edge on the positive side of the x-axis, and when the inclination angle α is negative, the antenna ground surface 41A is connected to the substrate ground surface 20A at an edge on the negative side of the x-axis. The other configuration, coordinate system, definitions of the inclination angle α, and the angle θ have the same manner as the case of the second example illustrated in FIG. 5B.

A horizontal axis of FIG. 6A indicates the angle θ in a unit "degree", and a vertical axis indicates a realized gain in a unit "dBi". In a case where the inclination angle α is 0°, that is, in a case where the antenna ground surface 41A and the substrate ground surface 20A are parallel to each other, the realized gain becomes maximum in a direction in which the angle θ is approximately 0°. As the inclination angle α is increased in the positive direction, the angle θ at which the realized gain becomes maximum is increased in the positive direction. Meanwhile, even when the inclination angle α is increased in the negative direction, the angle θ at which the realized gain becomes maximum is not increased in the negative direction. In the comparative example, even when the antenna ground surface 41A is inclined, a direction of a main beam cannot be controlled in a desired direction.

The reason why the direction of the main beam cannot be controlled in the comparative example is that the antenna ground surface 41A is connected to the substrate ground surface 20A only at the lower end of the antenna ground surface 41A. In this configuration, the antenna ground surface 41A does not sufficiently function as an antenna ground. On the other hand, in the second example, the ground potential of the antenna ground surface 41A is stabilized, so that the direction of the main beam can be controlled according to the inclination of the antenna ground surface 41A.

Next, impedance management and radiation characteristics of the feed line of the antenna device according to the second example will be described with reference to FIGS. 7A to 8C.

A simulation is performed on the reflection coefficient S11, an angular dependence of a realized gain, and a realized peak gain of the antenna device according to the second example and the antenna device according to the comparative example.

Figure 7A:
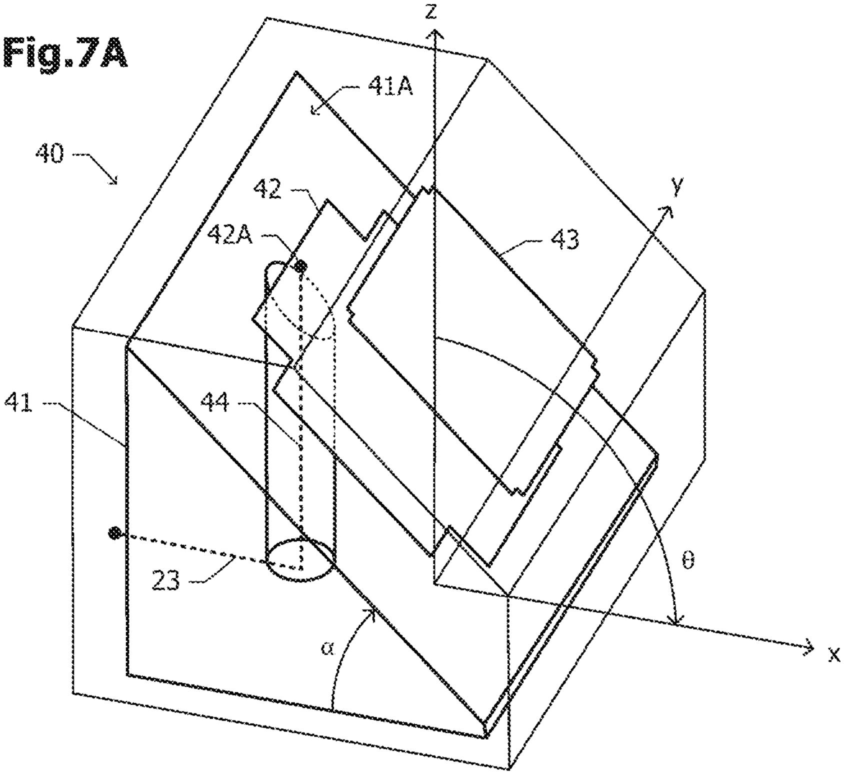
FIG. 7A is a perspective view of the antenna device according to the second example as a simulation target.
Figure 7B:
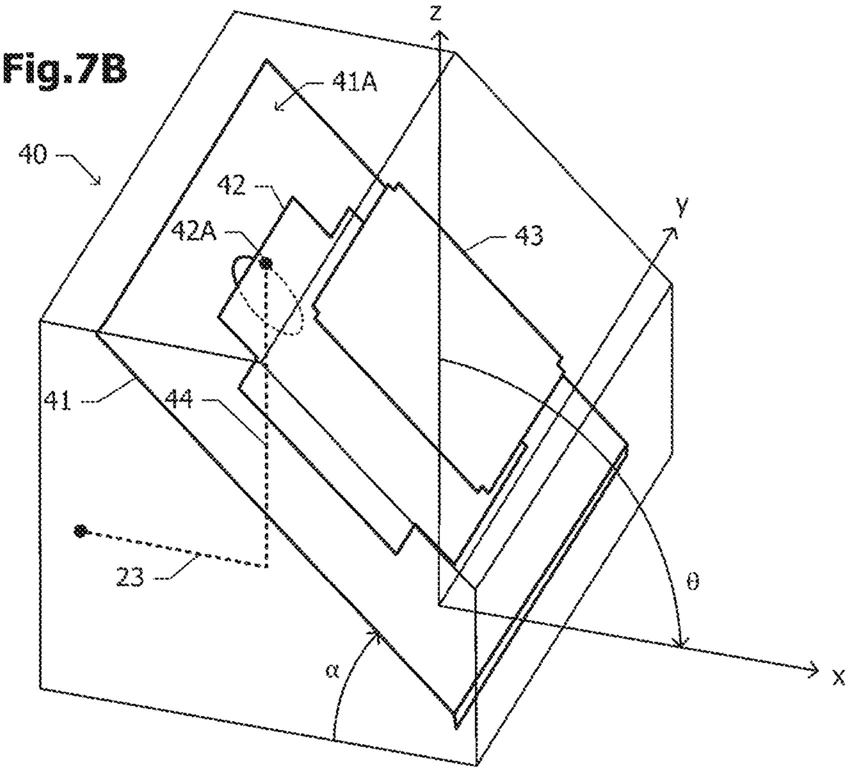
FIG. 7B is a perspective view of the antenna device according to the comparative example as the simulation target.

FIGS. 7A and 7B are perspective views of the antenna devices according to the second example and the comparative example as simulation targets, respectively. The feed element 42 and the parasitic element 43 have a shape in which four corners of a square are notched in square shapes. In the same manner as the antenna device according to the comparative example illustrated in FIG. 6B, in the antenna device according to the comparative example (FIG. 7B), the antenna ground surface 41A is connected to the substrate ground surface 20A (not illustrated in FIGS. 7A and 7B) only at a lower end of the antenna ground surface 41A. Definitions of an xyz orthogonal coordinate system, the inclination angle α, and the angle θ have the same manner as the definitions described with reference to FIGS. 5B and 6B.

Figure 8A:
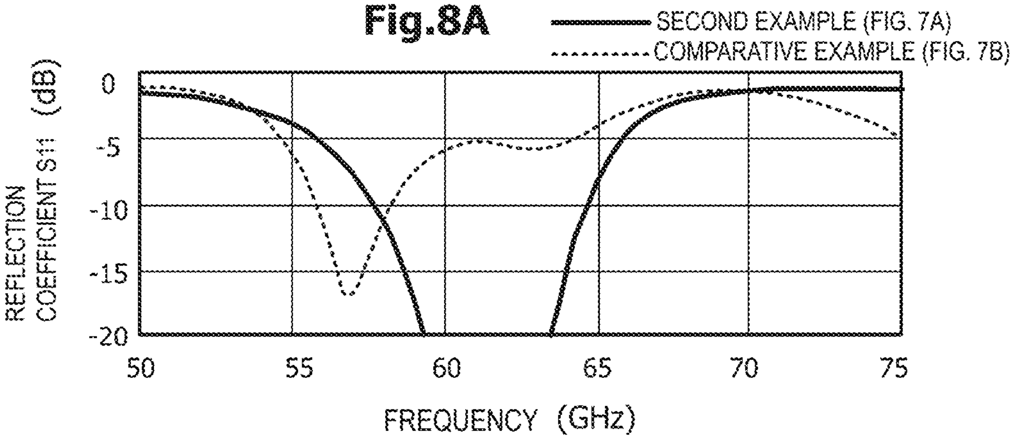
FIG. 8A is a graph illustrating the frequency dependence of the reflection coefficient S11.

FIG. 8A is a graph illustrating a frequency dependence of the reflection coefficient S11. A horizontal axis represents a frequency in a unit "GHz", and a vertical axis represents the reflection coefficient S11 in a unit "dB". A solid line and a broken line in FIG. 8A indicate the reflection coefficient S11 of the antenna devices according to the second example (FIG. 7A) and the comparative example (FIG. 7B), respectively. The inclination angle α is set to −45°.

In the antenna device according to the second example, it can be seen that the reflection coefficient S11 is equal to or less than −10 dB in a frequency band width of approximately 7 GHz centered on a frequency of 61 GHz. On the other hand, in the antenna device according to the comparative example, it can be seen that the reflection coefficient S11 is large and the impedance management is insufficient.

Figure 8B:
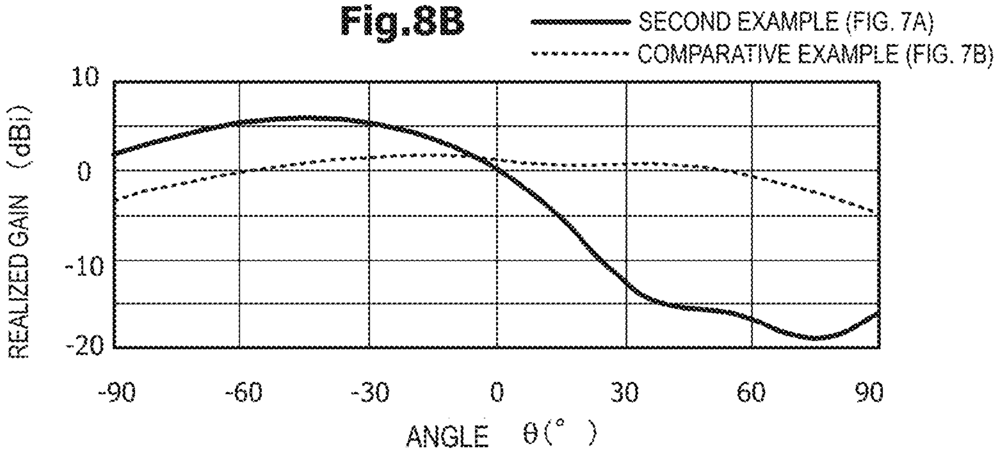
FIG. 8B is a graph illustrating the dependence of the realized gain on the angle θ.

FIG. 8B is a graph illustrating a dependency of a realized gain on the angle θ. A horizontal axis represents the angle θ in a unit "degree", and a vertical axis represents a realized gain in a unit "dBi". A solid line and a broken line in FIG. 8B indicate realized gains of the antenna devices according to the second example (FIG. 7A) and the comparative example (FIG. 7B), respectively. A frequency is 60 GHz, and the inclination angle α is −45°.

In the antenna device according to the second example, it can be seen that a direction of a main beam is inclined according to the inclination of the antenna ground surface 41A. On the other hand, in the antenna device according to the comparative example, it can be seen that a direction of a main beam is hardly changed even when the antenna ground surface 41A is inclined.

Figure 8C:
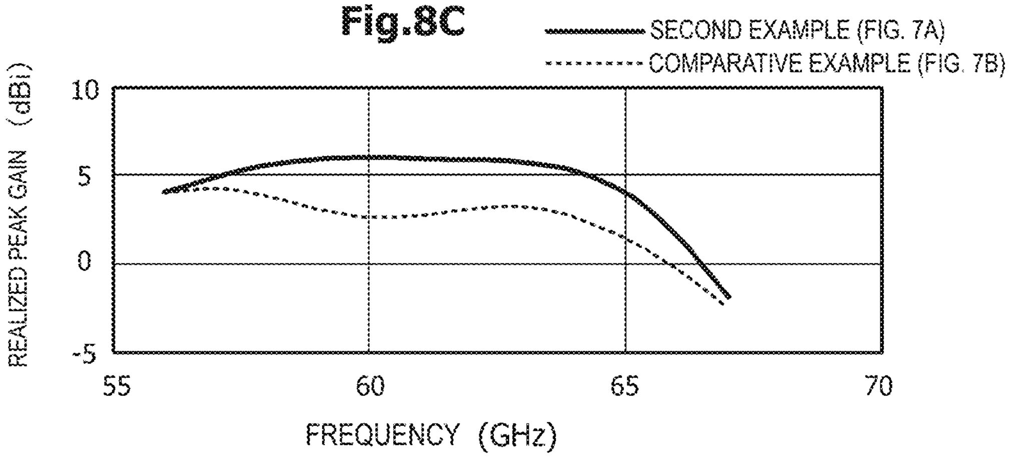
FIG. 8C is a graph illustrating the frequency dependence of the realized peak gain.

FIG. 8C is a graph illustrating a frequency dependence of a realized peak gain. A horizontal axis represents a frequency in a unit "GHz", and a vertical axis represents a realized peak gain in a unit "dBi". A solid line and a broken line in FIG. 8C indicate realized peak gains of the antenna devices according to the second example (FIG. 7A) and the comparative example (FIG. 7B), respectively. The inclination angle α is set to −45°.

It can be seen that a larger realized peak gain is obtained in the antenna device according to the second example than a realized peak gain of the antenna device according to the comparative example.

From the simulation results illustrated in FIGS. 8A, 8B, and 8C, it is checked that the impedance management can be easily performed, and the main beam can be directed in a desired direction by adopting the configuration of the antenna device according to the second example.

Figure 9A:
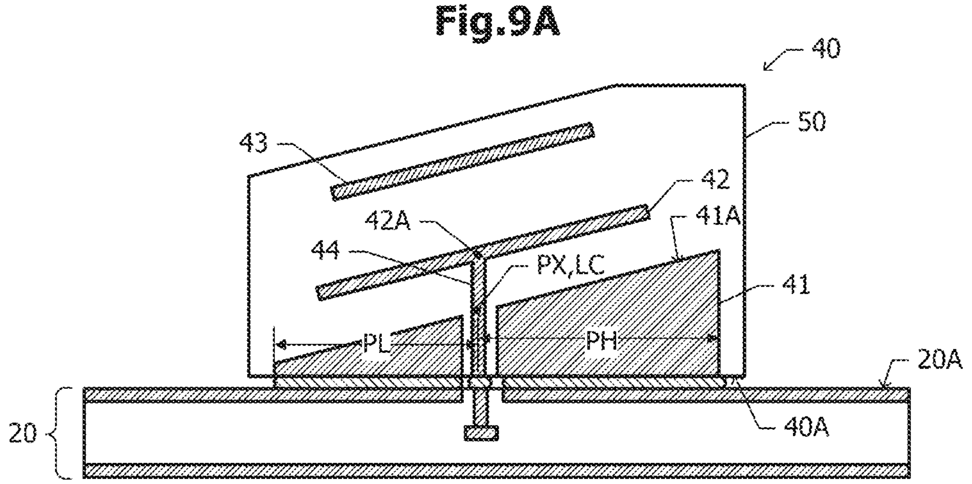
FIG. 9A is a cross-sectional diagram of an antenna device according to a modification example of the second example.
Figure 9B:
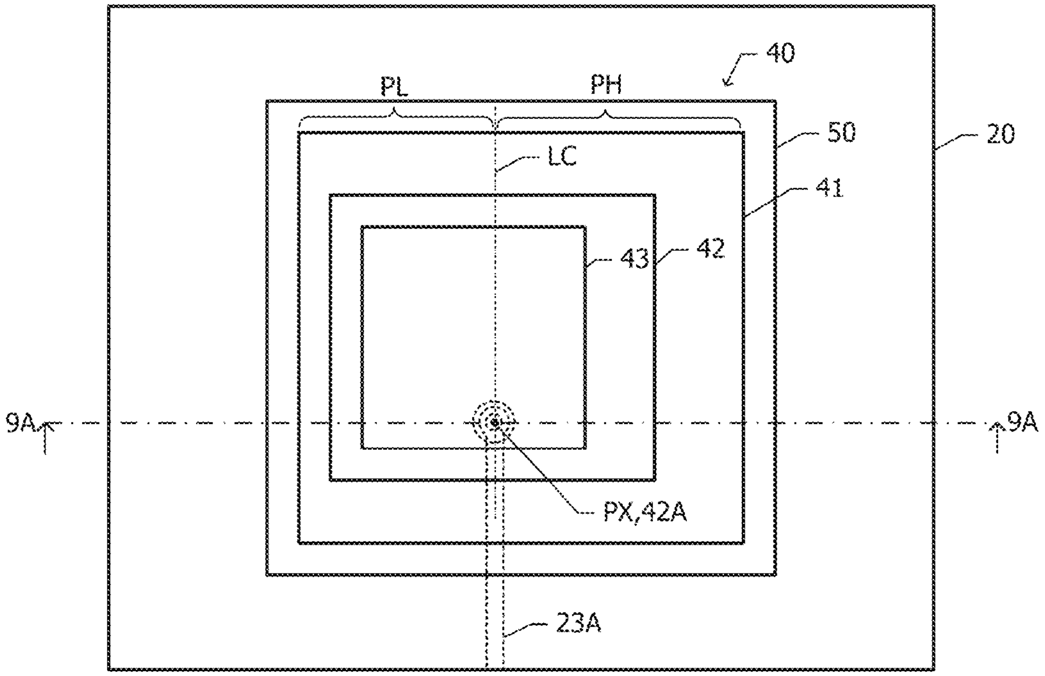
FIG. 9B is a plan view of the antenna device according to the modification example of the second example.

Next, an antenna device according to a modification example of the second example will be described with reference to FIGS. 9A and 9B. FIGS. 9A and 9B are a cross-sectional diagram and a plan view of an antenna device according to the modification example of the second example, respectively. A cross-sectional diagram taken along a dashed-dotted line 9A-9A in FIG. 9B corresponds to FIG. 9A.

In the second example (FIG. 4), the feed point 42A is provided slightly inside a midpoint of an edge disposed at the lowest position of the feed element 42. That is, the feed point 42A is provided at a position lower than a geometric center of the feed element 42. On the other hand, in the present modification example, the feed point 42A is disposed slightly inside the midpoint of one of inclined edges of the feed element 42. That is, a height from the bottom surface 40A of the dielectric block 40 to the geometric center of the feed element 42 is equal to a height to the feed point 42A.

In the present modification example as well, in the same manner as the second example, the antenna ground surface 41A is connected to the substrate ground surface 20A on both the lower side PL and the higher side PH of the contour line LC.

In this manner, the position of the feed point 42A may be provided at any position at which the feed element 42 can be excited, regardless of the direction of the inclination of the feed element 42. Further, the feed points 42A may be provided at two locations.

Third Example

Next, an antenna device according to a third example will be described with reference to FIGS. 10A and 10B. Hereinafter, a configuration in common with the antenna device according to the second example described with reference to FIGS. 4 to 8C will not be described.

Figure 10A:
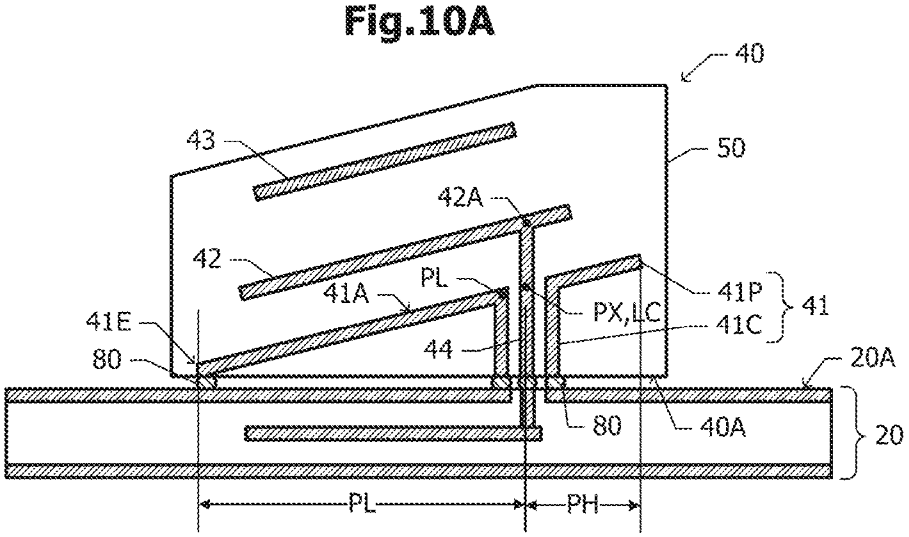
FIG. 10A is a cross-sectional diagram of an antenna device according to a third example.

FIG. 10A is a cross-sectional diagram of the antenna device according to the third example. In the second example (FIG. 4), the ground member 41 is configured with a conductor lump. On the other hand, in the third example, the ground member 41 includes a plate-shaped conductor member 41P and a connection member 41C extending from the conductor member 41P toward the substrate ground surface 20A. The connection member 41C includes a plurality of columnar members extending in a vertical direction with respect to the substrate ground surface 20A. Lower ends of the plurality of columnar members are exposed to the bottom surface 40A of the dielectric block 40, and the plurality of columnar members are respectively connected to the substrate ground surface 20A with the solder layer 80 interposed therebetween. The plate-shaped conductor member 41P is supported in a posture inclined with respect to the substrate ground surface 20A, and an upper surface of the conductor member 41P functions as the antenna ground surface 41A.

In FIG. 10A, the feed point 42A is provided at a position higher than a geometric center of the feed element 42. Meanwhile, the feed point 42A may be provided at a position lower than the geometric center in the same manner as the second example (FIG. 4), and may be provided at a position at the same height as the geometric center in the same manner as the modification example of the second example (FIGS. 9A and 9B).

Figure 10B:
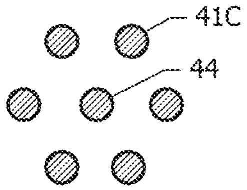
FIG. 10B is a plan cross-sectional diagram of a feed line and a connection member.

FIG. 10B is a plan cross-sectional diagram of the feed line 44 and the connection member 41C. The six columnar members of the connection member 41C are disposed at intervals in a peripheral direction to surround the feed line 44. As illustrated in FIG. 10A, some of the plurality of columnar members are connected to the antenna ground surface 41A on the side PH higher of the contour line LC, and are exposed to the bottom surface 40A of the dielectric block 40. Some other columnar members are connected to the antenna ground surface 41A on the lower side PL of the contour line LC, and are exposed to the bottom surface 40A of the dielectric block 40.

Further, the conductor member 41P is connected to the substrate ground surface 20A with the solder layer 80 interposed therebetween, at a lowermost edge 41E of the conductor member 41P. In this manner, the antenna ground surface 41A is connected to the substrate ground surface 20A, on both the higher side PH and the lower side PL of the contour line LC.

Next, excellent effects of the third example will be described.

In the third example as well, a ground potential of the antenna ground surface 41A is stabilized, as compared with a configuration in which the antenna ground surface 41A is connected to the substrate ground surface 20A only at the lowermost end of the antenna ground surface 41A. Further, since the connection member 41C connected to the substrate ground surface 20A surrounds the feed line 44, an excellent effect is obtained that impedance management of the feed line 44 is easy.

Figure 10C:
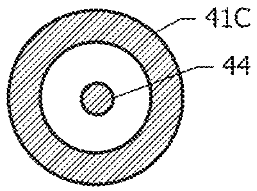
FIG. 10C is a plan view of a feed line and a connection member of an antenna device according to a modification example of the third example.

Next, an antenna device according to a modification example of the third example will be described with reference to FIG. 10C. FIG. 10C is a plan cross-sectional diagram of the feed line 44 and the connection member 41C of the antenna device according to the modification example of the third example. In the present modification example, the connection member 41C has a cylindrical shape, for example, a cylindrical shape. The feed line 44 passes through an inside of the cylindrical connection member 41C. In the same manner as the present modification example, the connection member 41C may have a cylindrical shape, and the connection member 41C may continuously surround the feed line 44 in the peripheral direction.

Figure 11A:
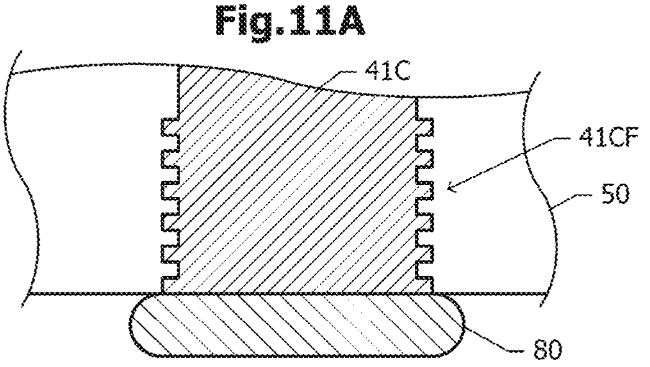
FIG. 11A is a cross-sectional diagram of a lower end of a connection member included in an antenna device according to another modification example of the third example.
Figure 11B:
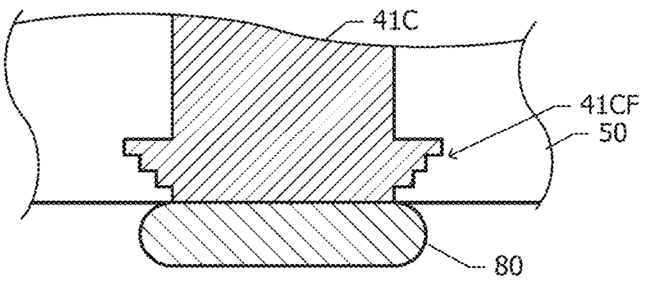
FIG. 11B is another cross-sectional diagram of the lower end of the connection member included in the antenna device according to the other modification example of the third example.
Figure 11C:
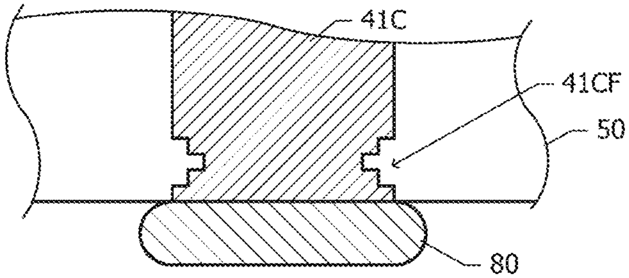
FIG. 11C is a further cross-sectional diagram of the lower end of the connection member included in the antenna device according to the other modification example of the third example.

Next, an antenna device according to another modification example of the third example will be described with reference to FIGS. 11A, 11B, and 11C. FIGS. 11A, 11B, and 11C are cross-sectional diagrams of lower ends of the connection member 41C included in the antenna device according to the other modification example of the third example. The solder layer 80 is in contact with the lower end of the connection member 41C.

As illustrated in FIGS. 11A, 11B, and 11C, a projection portion or a recess portion extending in a peripheral direction is formed on a side surface of the lower end of the connection member 41C. Such a structure is referred to as a framing structure 41CF, in some cases. In the modification example illustrated in FIG. 11A, a plurality of projection portions that circle once in the peripheral direction are disposed side by side in an axial direction. In the modification example illustrated in FIG. 11B, a height of the projection portion that circles once in the peripheral direction is increased in a stepped manner upward from the lower end of a connection member 41C. A surface of the framing structure 41CF does not necessarily have a geometrically complete stepped shape, and may have a wavy shape in which a boundary between a tread and a riser is not clear. In the modification example illustrated in FIG. 11C, a recess portion that circles once in the peripheral direction is formed at a side surface of the connection member 41C. The recess portion becomes deep once from the lower end of the connection member 41C upward, and thereafter becomes shallow.

By forming the framing structure 41CF illustrated in FIGS. 11A, 11B, and 11C, a fixing strength between the connection member 41C and the dielectric member 50 at an interface surface is increased. Further, infiltration of moisture along the interface surface between the connection member 41C and the dielectric member 50 from the lower end of the connection member 41C is reduced. Thus, humidity resistance performance of the antenna device is improved.

Fourth Example

Next, an antenna device according to a fourth example will be described with reference to FIGS. 12A to 12C. Hereinafter, a configuration in common with the antenna device according to the third example described with reference to FIGS. 10A and 10B will not be described.

Figure 12A:
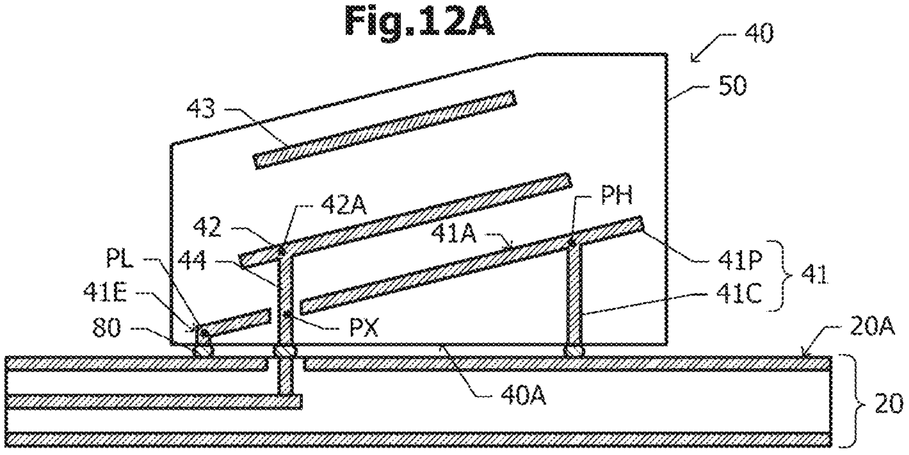
FIG. 12A is a cross-sectional diagram of an antenna device according to a fourth example.
Figure 12B:
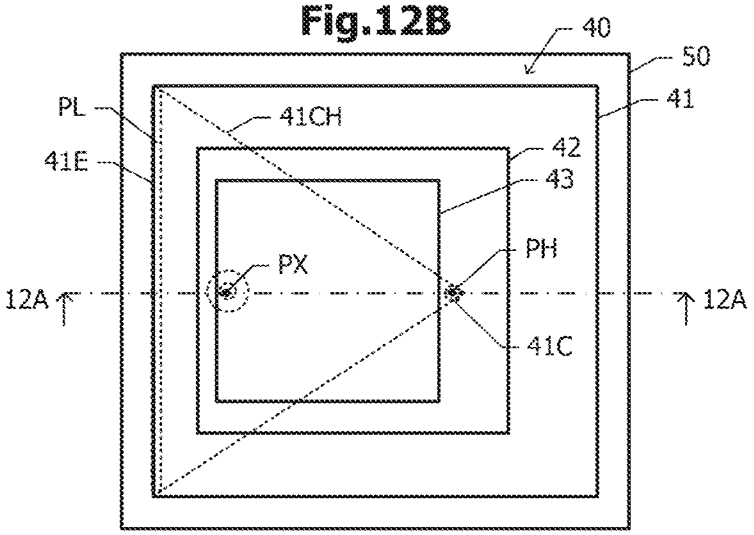
FIG. 12B is a plan view of the antenna device according to the fourth example.

FIGS. 12A and 12B are a cross-sectional diagram and a plan view of the antenna device according to the fourth example, respectively. A cross-sectional diagram taken along a dashed-dotted line 12A-12A in FIG. 12B corresponds to FIG. 12A. In the same manner as the third example, in the fourth example as well, the ground member 41 includes the plate-shaped conductor member 41P and the columnar connection member 41C. In the third example (FIG. 10B), a plurality of columnar members constituting the connection member 41C surround the feed line 44. Meanwhile, in the fourth example, the connection member 41C does not surround the feed line 44. The connection member 41C is connected to the antenna ground surface 41A on the side PH higher of the contour line LC, and is exposed to the bottom surface 40A of the dielectric block 40. Further, the ground member 41 is exposed to the bottom surface 40A of the dielectric block 40 even at the lowermost edge 41E (on the side PL lower of the contour line LC), and is connected to the substrate ground surface 20A.

Next, excellent effects of the fourth example will be described. In the same manner as the third example, in the fourth example as well, a ground potential of the antenna ground surface 41A is stabilized, as compared with a configuration in which the antenna ground surface 41A is connected to the substrate ground surface 20A only at the lowermost edge 41E of the antenna ground surface 41A.

Next, a preferable position at which the connection member 41C is connected in the antenna ground surface 41A will be described. In order to stabilize a ground potential of the antenna ground surface 41A, it is preferable that a location at which the antenna ground surface 41A is connected to the substrate ground surface 20A is not localized but is distributed as widely as possible.

In the example illustrated in FIG. 12B, the antenna ground surface 41A is connected to the substrate ground surface 20A at a connection location between the lowermost edge 41E and the connection member 41C. In order to avoid localizing the location at which the antenna ground surface 41A is connected to the substrate ground surface 20A, the connection location to the substrate ground surface 20A is preferably disposed such that an area of a convex hull 41CH at the location connected to the antenna ground surface 20A is increased. Here, the convex hull means a minimum convex polygon including a point group.

Figure 12C:
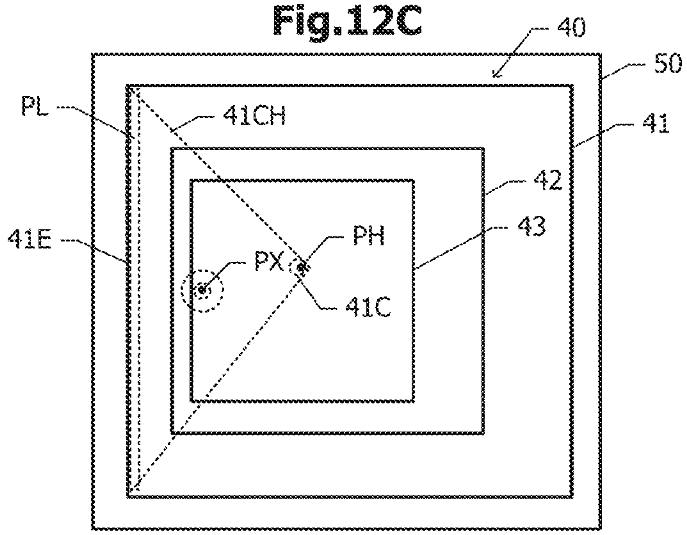
FIG. 12C is a plan view of the antenna device in a case where a position of the connection member is shifted in a direction of a lowermost edge of an antenna ground surface.

FIG. 12C is a plan view of the antenna device in a case where a position of the connection member 41C is shifted in a direction of the lowermost edge 41E of the antenna ground surface 41A. When the position of the connection member 41C is shifted in the direction of the lowermost edge 41E of the antenna ground surface 41A, the area of the convex hull 41CH is reduced. When the connection member 41C is brought too close to the lowermost edge 41E, the effect of stabilizing the ground potential of the antenna ground surface 41A is weakened.

In order to obtain the sufficient effect of stabilizing the ground potential of the antenna ground surface 41A, the connection location to the substrate ground surface 20A is preferably disposed such that the area of the convex hull 41CH is 20% or more of an area of the antenna ground surface 41A.

Next, an antenna device according to a modification example of the fourth example will be described. In the fourth example, the lowermost edge 41E of the antenna ground surface 41A is connected to the substrate ground surface 20A. Meanwhile, the lowermost edge 41E is not necessarily connected to the substrate ground surface 20A. The connection member 41C may be connected at a plurality of locations other than the lowermost edge 41E. Also in this case, it is preferable that the plurality of connection members 41C are disposed such that an area of the convex hull 41CH is 20% or more of an area of the antenna ground surface 41A.

Fifth Example

Next, an antenna device according to a fifth example will be described with reference to FIGS. 13A and 13B. Hereinafter, a configuration in common with the antenna device according to the fourth example described with reference to FIGS. 12A to 12C will not be described.

Figure 13A:
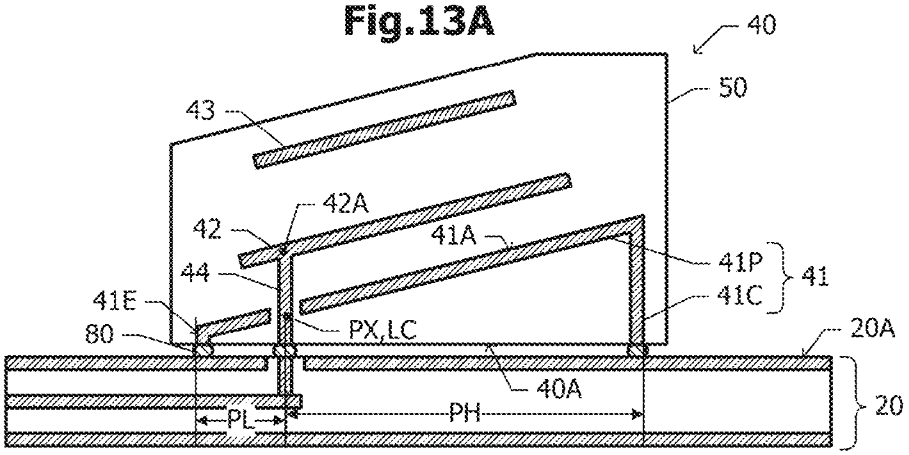
FIG. 13A is a cross-sectional diagram of an antenna device according to a fifth example.
Figure 13B:
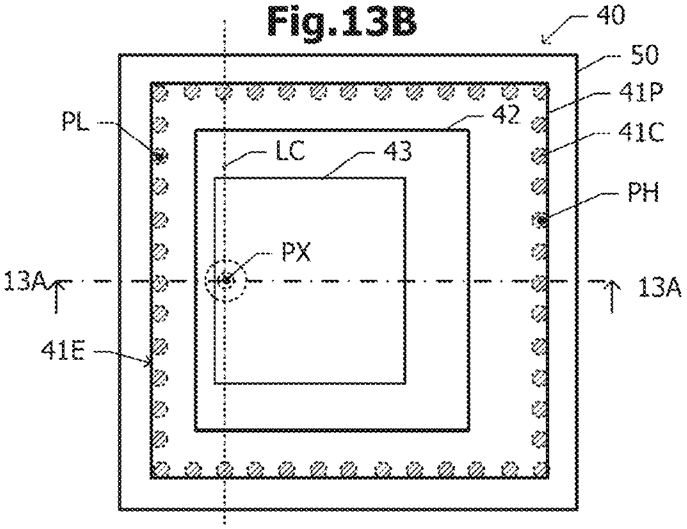
FIG. 13B is a plan view of the antenna device according to the fifth example.

FIGS. 13A and 13B are a cross-sectional diagram and a plan view of the antenna device according to the fifth example, respectively. A cross-sectional diagram taken along a dashed-dotted line 13A-13A in FIG. 13B corresponds to FIG. 13A. In the fourth example (FIGS. 12A and 12B), the connection member 41C is connected to an inner back portion of the antenna ground surface 41A. On the other hand, in the fifth example, a plurality of columnar members constituting the connection member 41C extend from four edges of the antenna ground surface 41A toward the bottom surface 40A of the dielectric block 40. In FIG. 13B, the connection member 41C is hatched.

Some columnar members of the plurality of columnar members of the connection member 41C are connected to the antenna ground surface 41A on the higher side PH of the contour line LC, and are exposed to the bottom surface 40A of the dielectric block 40. The remaining columnar members are connected to the antenna ground surface 41A, on the side PL lower of the contour line LC, and are exposed to the bottom surface 40A of the dielectric block 40. The lowermost edge 41E of the antenna ground surface 41A may be connected to the substrate ground surface 20A with the solder layer 80 interposed therebetween, without the columnar member being disposed.

Next, excellent effects of the fifth example will be described.

In the same manner as the fourth example, in the fifth example as well, an excellent effect that a ground potential of the antenna ground surface 41A is stabilized is obtained.

Figure 13C:
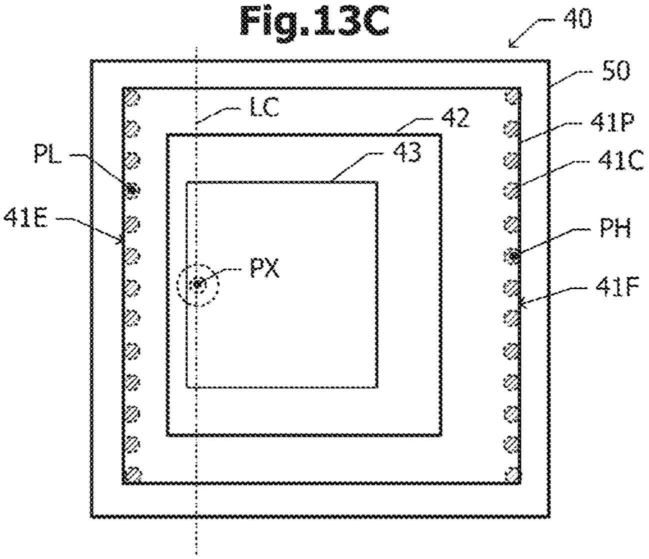
FIG. 13C is a plan view of an antenna device according to a modification example of the fifth example.
Figure 14A:
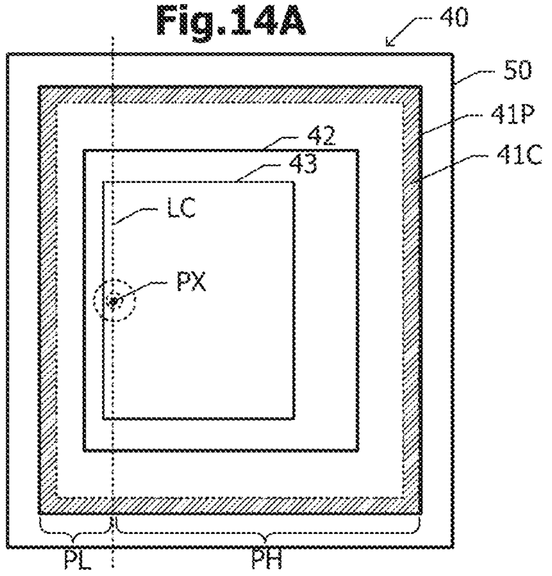
FIG. 14A is a plan view of the antenna device according to the modification example of the fifth example.
Figure 14B:
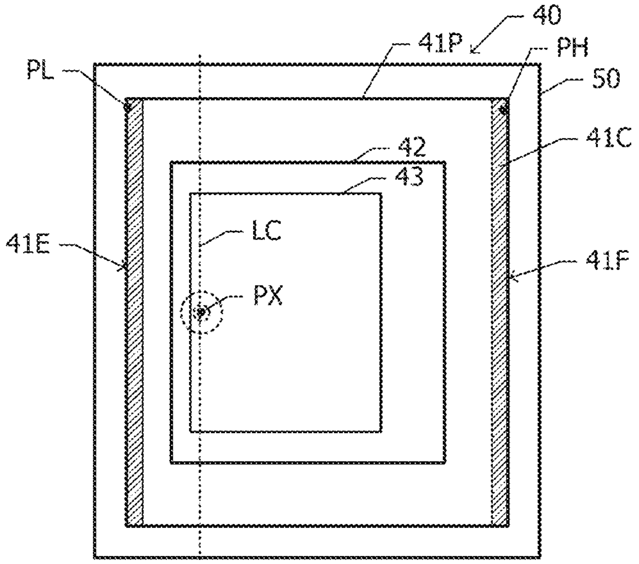
FIG. 14B is another plan view of the antenna device according to the modification example of the fifth example.

Next, a modification example of the fifth example will be described with reference to FIGS. 13C, 14A, and 14B. FIGS. 13C, 14A, and 14B are plan views of an antenna device according to the modification example of the fifth example. In FIGS. 13C, 14A, and 14B, the connection member 41C is hatched.

In the modification example illustrated in FIG. 13C, a plurality of columnar members constituting the connection member 41C are connected to the lowermost edge 41E and an uppermost edge 41F of the antenna ground surface 41A. In the modification example illustrated in FIG. 14A, the connection member 41C is continuously disposed along four edges of the antenna ground surface 41A. In the modification example illustrated in FIG. 14B, the connection member 41C is continuously disposed along the lowermost edge 41E and the uppermost edge 41F of the antenna ground surface 41A. In the modification example illustrated in FIGS. 14A and 14B, the connection member 41C constitutes a wall perpendicular to the bottom surface 40A (FIG. 13A) of the dielectric block 40.

In the same manner as the modification examples illustrated in FIGS. 13C and 14B, the connection member 41C may be disposed along the lowermost edge 41E and the uppermost edge 41F of the antenna ground surface 41A. Further, in the same manner as the modification examples illustrated in FIGS. 14A and 14B, the connection member 41C may be configured with a wall perpendicular to the substrate ground surface 20A.

Sixth Example

Next, an antenna device according to a sixth example will be described with reference to FIG. 15A. Hereinafter, a configuration in common with the antenna device according to the second example described with reference to FIGS. 4 to 8C will not be described.

Figure 15A:
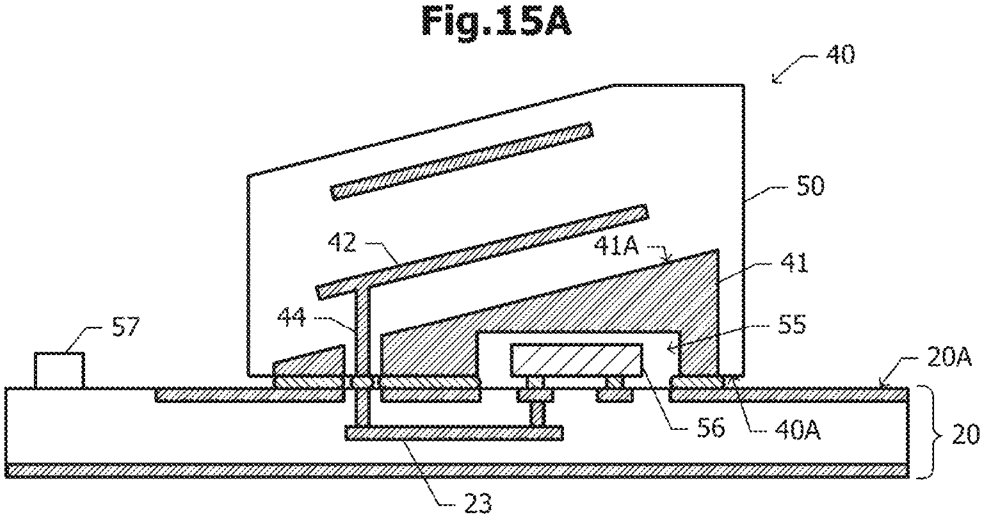
FIG. 15A is a cross-sectional diagram of an antenna device according to a sixth example.

FIG. 15A is a cross-sectional diagram of the antenna device according to the sixth example. In the second example, the bottom surface 40A of the dielectric block 40 is flat. On the other hand, in the sixth example, a recess portion 55 is formed at the bottom surface 40A of the dielectric block 40.

More specifically, the recess portion 55 is formed on a bottom surface of the ground member 41. Thus, a cavity is generated between the substrate ground surface 20A and the antenna ground surface 41A.

A circuit element 56 mounted on the substrate 20 is accommodated in the recess portion 55. The circuit element 56 is, for example, a high-frequency integrated circuit element or the like including a high-frequency power amplifier circuit or the like. The circuit element 56 is connected to the feed element 42 through the feed line 23 in the substrate 20 and the feed line 44 in the dielectric block 40. The circuit element 56 may include a high-frequency component such as a filter.

Further, a connector 57 is mounted on the substrate 20. For example, the connector 57 is connected to an external baseband integrated circuit through a coaxial cable or the like, and is connected to the circuit element 56 through wiring in the substrate 20. A baseband signal, a control signal, power supply, and the like are transmitted and received between the baseband integrated circuit and the circuit element 56 through the coaxial cable.

Next, excellent effects of the sixth example will be described. In the same manner as the second example, in the sixth example as well, a ground potential of the antenna ground surface 41A can be stabilized.

In addition, in the sixth example, the dielectric block 40 and the circuit element 56 are mounted to overlap with each other in the plan view. Therefore, an utilization efficiency of a mounting surface of the substrate 20 can be improved. Further, the ground member 41 that covers the circuit element 56 functions as a shield structure. Therefore, electromagnetic interference between the circuit element 56 and other components or the dielectric block 40 can be reduced.

Figure 15B:
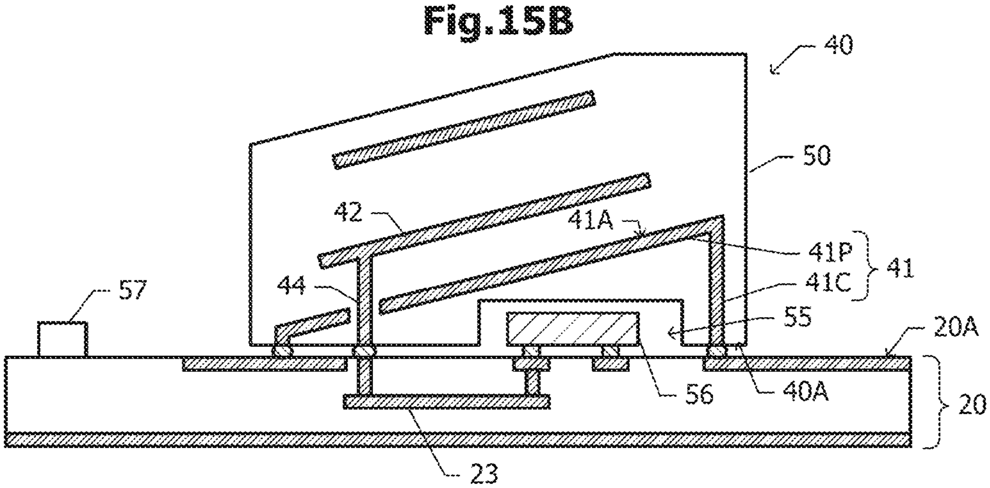
FIG. 15B is a cross-sectional diagram of an antenna device according to a modification example of the sixth example.

Next, an antenna device according to a modification example of the sixth example will be described with reference to FIG. 15B. FIG. 15B is a cross-sectional diagram of the antenna device according to the modification example of the sixth example. In the sixth example, as the ground member 41, the same conductor lump as the conductor lump in the second example is used. On the other hand, in the modification example illustrated in FIG. 15B, the ground member 41 includes the plate-shaped conductor member 41P and the connection member 41C formed of a plurality of columnar members, in the same manner as the fifth example (FIG. 13A). The recess portion 55 is formed at a surface of the dielectric member 50 facing the substrate 20. The circuit element 56 is accommodated in the recess portion 55.

In the present modification example, the plate-shaped conductor member 41P and the plurality of columnar members of the connection member 41C function as a shield structure. As the ground member 41, one having the same structure as the ground member 41 of the antenna device according to the modification example of the fifth example illustrated in FIGS. 13C, 14A, and 14B may be adopted.

The circuit element 56 mounted on the antenna device according to the sixth example is a high-frequency integrated circuit element or a filter, and another element may be adopted as the circuit element 56. For example, various surface mount devices related to the operation of the antenna, circuit elements having a conductor pattern formed on a surface layer of the substrate 20, and the like may be accommodated in the recess portion 55. Further, a circuit element unrelated to the antenna operation may be accommodated in the recess portion 55. For example, when a conductor pattern is disposed at the surface layer of the substrate 20 of FIG. 15A to be included in the recess portion 55 in the plan view, a distance from the conductor pattern to the ground member 41 becomes longer than a case where the recess portion 55 is not provided. Thus, a characteristic change of the circuit element formed of the conductor pattern is reduced before and after the mounting of the dielectric block 40.

Seventh Example

Next, an antenna device according to a seventh example will be described with reference to FIG. 16. Hereinafter, a configuration in common with the antenna device according to the second example described with reference to FIGS. 4 to 8C will not be described.

Figure 16:
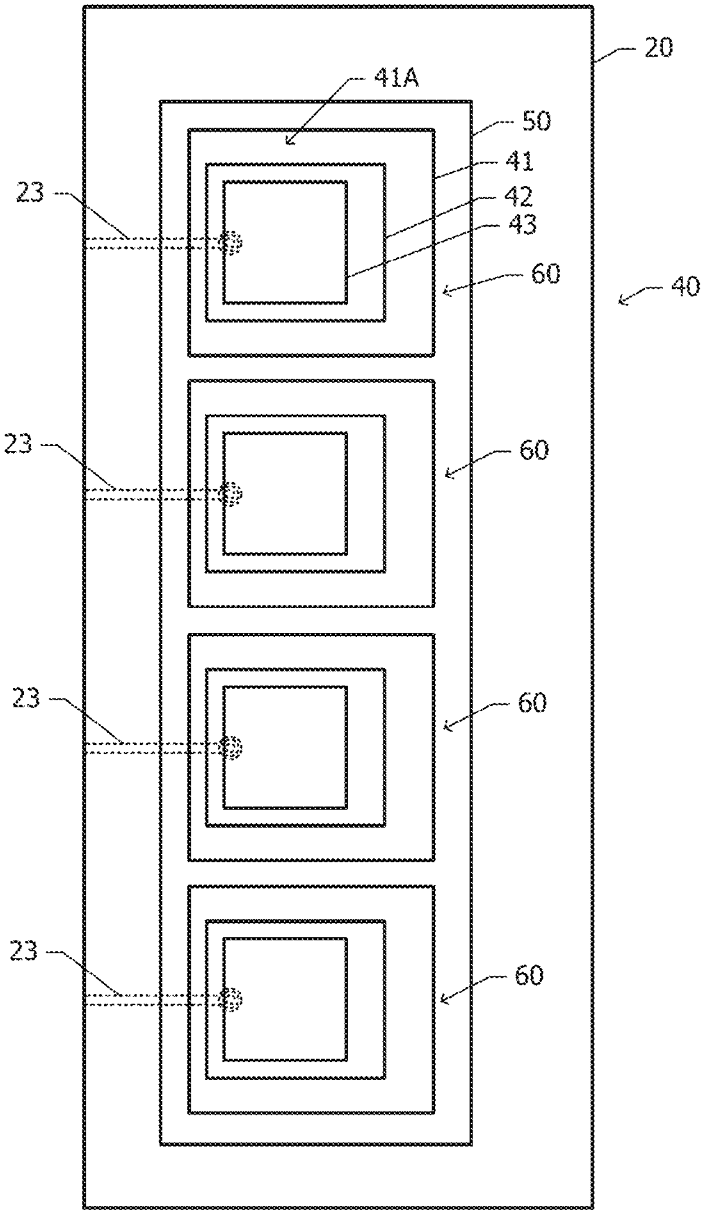
FIG. 16 is a plan view of an antenna device according to a seventh example.

FIG. 16 is a plan view of the antenna device according to the seventh example. In the second example (FIG. 4), one patch antenna including the ground member 41, the feed element 42, and the parasitic element 43 is built in one dielectric member 50. On the other hand, in the seventh example, a plurality of patch antennas 60 are built in one dielectric member 50. That is, one dielectric block 40 includes the plurality of patch antennas 60. Each of the plurality of patch antennas 60 includes the ground member 41, the feed element 42, and the parasitic element 43. The feed line 23 is disposed for each feed element 42.

The antenna ground surfaces 41A of a plurality of ground members 41 are disposed on a common virtual plane. Further, a plurality of feed elements 42 are also disposed on the common virtual plane, and a plurality of parasitic elements 43 are also disposed on the common virtual plane. That is, normal directions of the plurality of antenna ground surfaces 41A, the plurality of feed elements 42, and the plurality of parasitic elements 43 are parallel to each other. The plurality of patch antennas 60 are arrayed, and the antenna device operates as an array antenna.

Next, excellent effects of the seventh example will be described.

In the seventh example as well, a ground potential of each of the antenna ground surfaces 41A of the plurality of patch antennas 60 can be stabilized. Further, since the plurality of patch antennas 60 are built in one dielectric member 50, a mounting step can be simplified, as compared with a case where individual patch antennas are mounted on the substrate 20.

Figure 17:
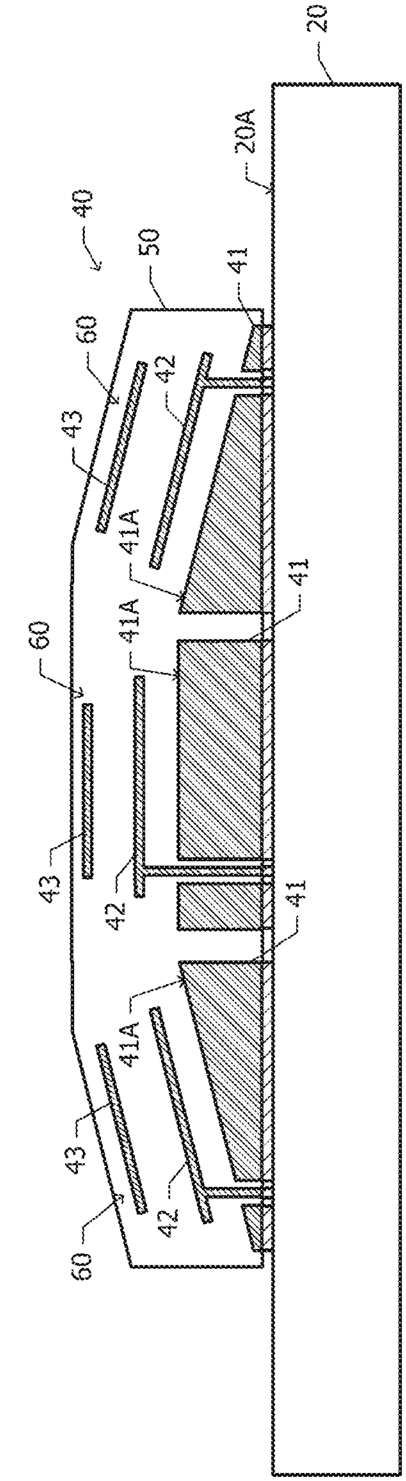
FIG. 17 is a cross-sectional diagram of an antenna device according to a modification example of the seventh example.

Next, an antenna device according to a modification example of the seventh example will be described with reference to FIG. 17. FIG. 17 is a cross-sectional diagram of the antenna device according to the modification example of the seventh example.

In the seventh example, normal directions of the antenna ground surfaces 41A of the plurality of patch antennas 60 are parallel to each other. On the other hand, in the present modification example, normal directions of the antenna ground surfaces 41A of the plurality of patch antennas 60 built in one dielectric member 50 are different from each other. In the example illustrated in FIG. 17, three patch antennas 60 are built in one dielectric member 50. The antenna ground surface 41A of the left end patch antenna 60 and the antenna ground surface 41A of the right end patch antenna 60 are inclined in opposite directions from each other with respect to the substrate ground surface 20A. The antenna ground surface 41A of the patch antenna 60 at a center is parallel to the substrate ground surface 20A.

In the antenna device according to the present modification example, the patch antenna 60 of which a main beam faces in the normal direction of the substrate ground surface 20A and the patch antenna 60 of which a main beam point faces in a direction inclined with respect to the substrate ground surface 20A are obtained. Thus, an antenna device having more-wide directivity can be realized.

Next, an antenna device according to another modification example of the seventh example will be described. In the modification example illustrated in FIG. 17, the plurality of patch antennas 60 having different front directions are built in one dielectric member 50. As the other modification example, a dielectric block having the antenna ground surface 41A inclined with respect to the substrate ground surface 20A and a dielectric block having the antenna ground surface 41A parallel to the substrate ground surface 20A are individually manufactured, the dielectric blocks may be mounted on the common substrate 20.

Eighth Example

Next, an antenna device according to an eighth example will be described with reference to FIGS. 18 to 20C. Hereinafter, a configuration in common with the antenna device according to the second example described with reference to FIGS. 4 to 8C will not be described.

Figure 18:
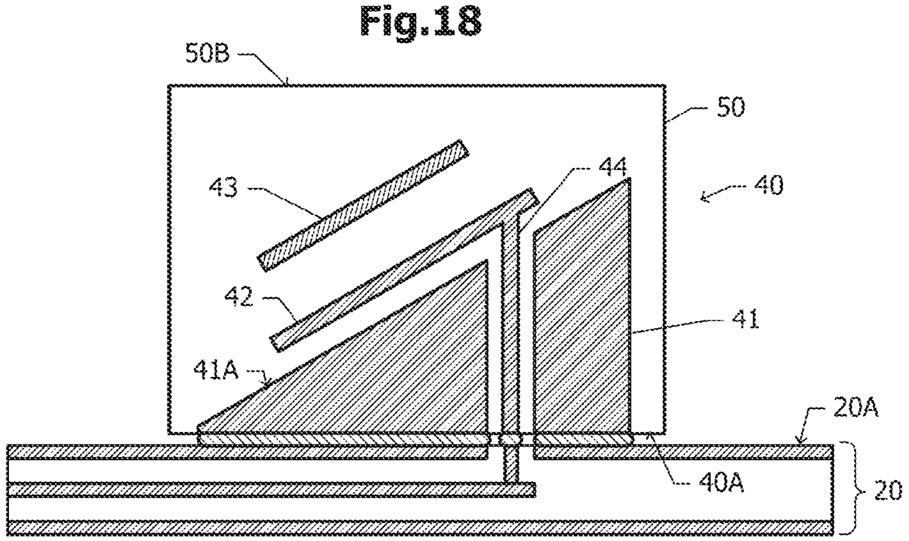
FIG. 18 is a cross-sectional diagram of an antenna device according to an eighth example.

FIG. 18 is a cross-sectional diagram of the antenna device according to the eighth example. In the second example (FIG. 4), the dielectric member 50 has the inclined surface 50A inclined with respect to the bottom surface 40A of the dielectric block 40. On the other hand, in the eighth example, the dielectric member 50 does not have the inclined surface 50A. An entire upward surface of the dielectric member 50 is configured with only the top surface 50B parallel to the bottom surface 40A of the dielectric block 40. An outer shape of the dielectric block 40 is a rectangular parallelepiped.

Next, simulation results of antenna characteristics of the antenna devices according to the second example and the eighth example will be described with reference to FIGS. 19A to 20C.

Figure 19A:
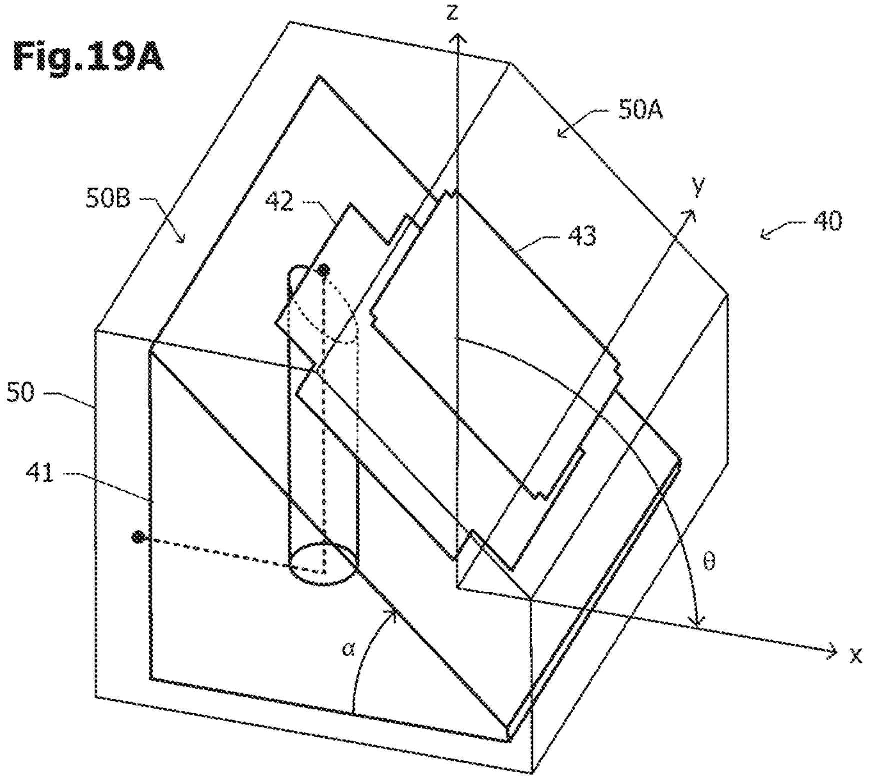
FIG. 19A is a perspective view of the antenna device according to the second example as a simulation target.
Figure 19B:
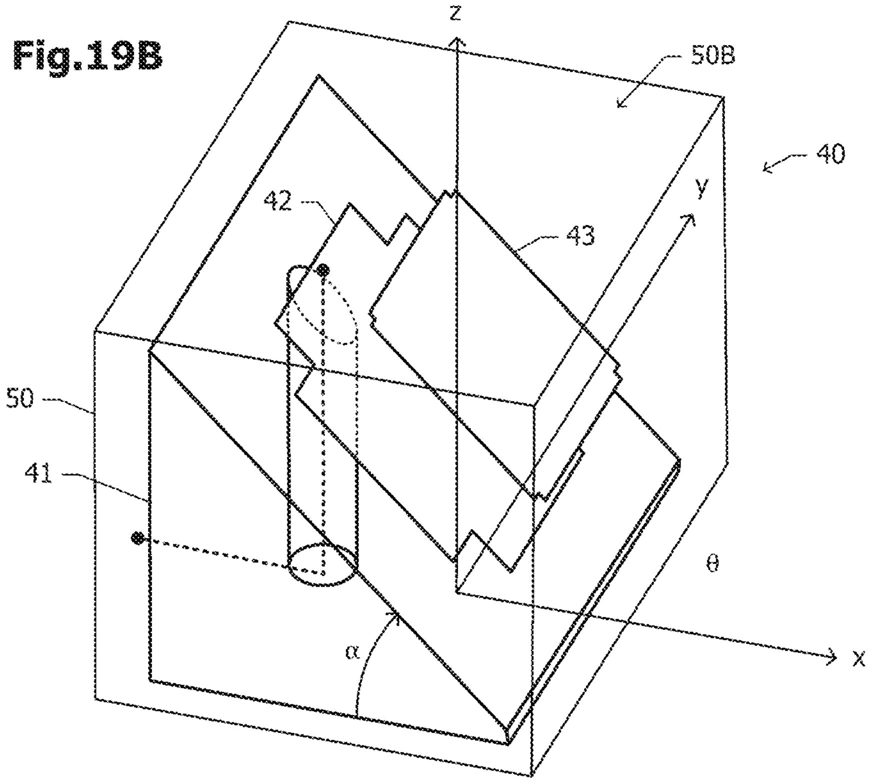
FIG. 19B is a perspective view of an antenna device according to the eighth example as the simulation target.

FIGS. 19A and 19B are perspective views of the antenna devices according to the second example (FIG. 4) and the eighth example as simulation targets, respectively. The antenna device illustrated in FIG. 19A is the same as the antenna device illustrated in FIG. 7A. The dielectric member 50 has the inclined surface 50A and the top surface 50B. The dielectric member 50 of the antenna device according to the eighth example illustrated in FIG. 19B does not have the inclined surface 50A, and an entire upward surface is configured with the top surface 50B parallel to the bottom surface 40A (FIG. 18) of the dielectric block 40.

Figure 20A:
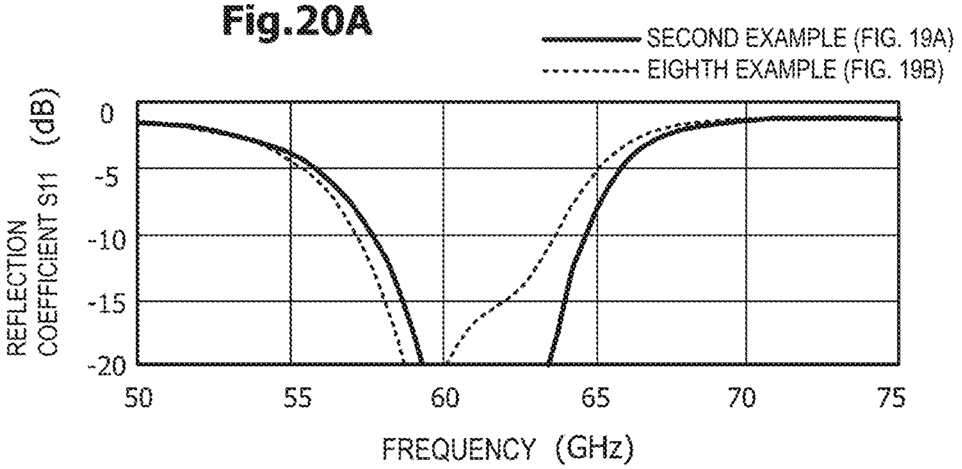
FIG. 20A is a graph illustrating the frequency dependence of the reflection coefficient S11.

FIG. 20A is a graph illustrating a frequency dependence of the reflection coefficient S11. A horizontal axis represents a frequency in a unit "GHz", and a vertical axis represents the reflection coefficient S11 in a unit "dB". A solid line and a broken line in FIG. 20A indicate the reflection coefficient S11 of the antenna devices according to the second example (FIG. 19A) and the eighth example (FIG. 19B), respectively. The inclination angle $\alpha$ is set to −45°.

In the antenna device according to the second example, it can be seen that the reflection coefficient S11 is equal to or less than −10 dB in a frequency band width of approximately 7 GHz centered on a frequency of approximately 61 GHz. Further, in the antenna device according to the eighth example, it can be seen that the reflection coefficient S11 is −10 dB or less in a frequency band width of approximately 7 GHz centered on a frequency of approximately 60 GHz. In the same manner as the second example, in the eighth example as well, it is possible to perform sufficient impedance management.

Figure 20B:
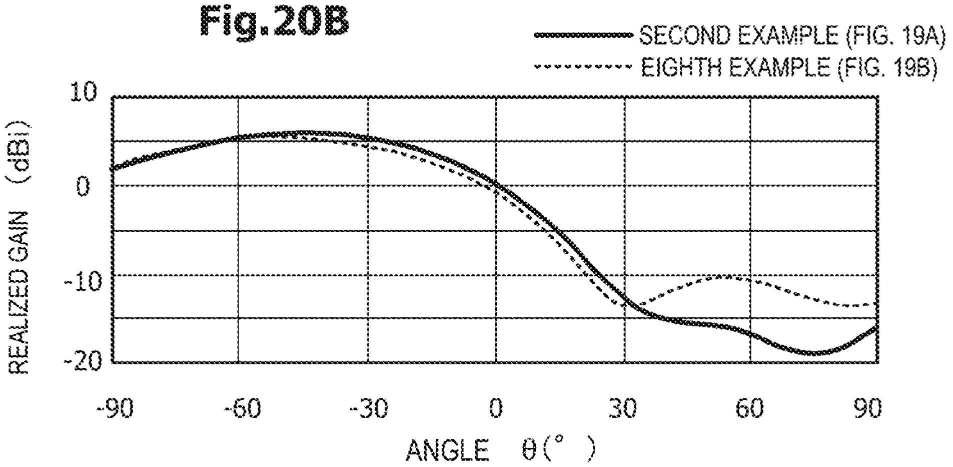
FIG. 20B is a graph illustrating the dependence of the realized gain on the angle θ.

FIG. 20B is a graph illustrating a dependency of a realized gain on the angle $\theta$. A horizontal axis represents the angle $\theta$ in a unit "degree", and a vertical axis represents a realized gain in a unit "dBi". A solid line and a broken line in FIG. 20B indicate realized gains of the antenna devices according to the second example (FIG. 19A) and the eighth example (FIG. 19B), respectively. A frequency is 60 GHz, and the inclination angle $\alpha$ is −45°.

In any antenna device of the second example and the eighth example as well, it can be seen that a direction of a main beam is inclined according to the inclination of the antenna ground surface 41A. In the same manner as the second example, in the eighth example as well, the antenna ground surface 41A is inclined, so that it is possible to change the direction of the main beam.

Figure 20C:
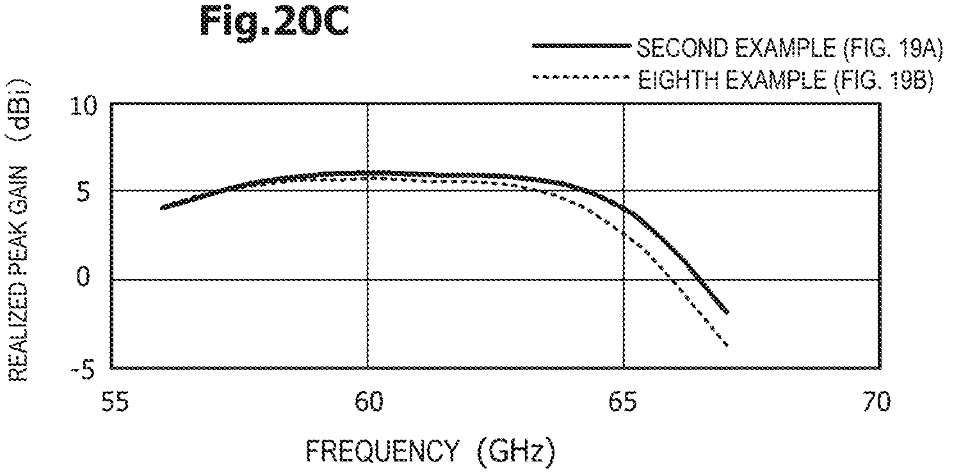
FIG. 20C is a graph illustrating the frequency dependence of the realized peak gain.

FIG. 20C is a graph illustrating a frequency dependence of a realized peak gain. A horizontal axis represents a frequency in a unit "GHz", and a vertical axis represents a realized peak gain in a unit "dBi". A solid line and a broken line in FIG. 20C indicate realized peak gains of the antenna devices according to the second example (FIG. 19A) and the eighth example (FIG. 19B), respectively. The inclination angle $\alpha$ is set to $-45°$. It can be seen that a realized peak gain of approximately the same magnitude as the realized peak gain of the second example is also obtained in the eighth example.

From the simulation results illustrated in FIGS. 20A, 20B, and 20C, it is checked that the antenna characteristics similar to the antenna characteristics of the second example can be obtained in the antenna device according to the eighth example.

Next, excellent effects of the eighth example will be described. In the eighth example, since the entire upward surface of the dielectric member 50 is the top surface 50B parallel to the substrate ground surface 20A, in a step of mounting the dielectric block 40 on the substrate 20, the top surface 50B of the dielectric block 40 can be easily sucked by a chip mounter. Therefore, the dielectric block 40 can be easily mounted on the substrate 20.

In the eighth example, the entire upward surface of the dielectric member 50 is configured with the top surface 50B parallel to the bottom surface 40A of the dielectric block 40. Meanwhile, the entire upward surface is not necessarily provided with the top surface 50B parallel to the bottom surface 40A. When the bottom surface 40A is viewed in the plan view, the top surface 50B may include the antenna ground surface 41A. Even in this case, the top surface 50B of the dielectric block 40 can be easily sucked by a chip mounter.

Ninth Example

Next, an antenna device according to a ninth example will be described with reference to FIG. 21. Hereinafter, a configuration in common with the antenna device according to the second example described with reference to FIGS. 4 to 8C will not be described.

Figure 21:
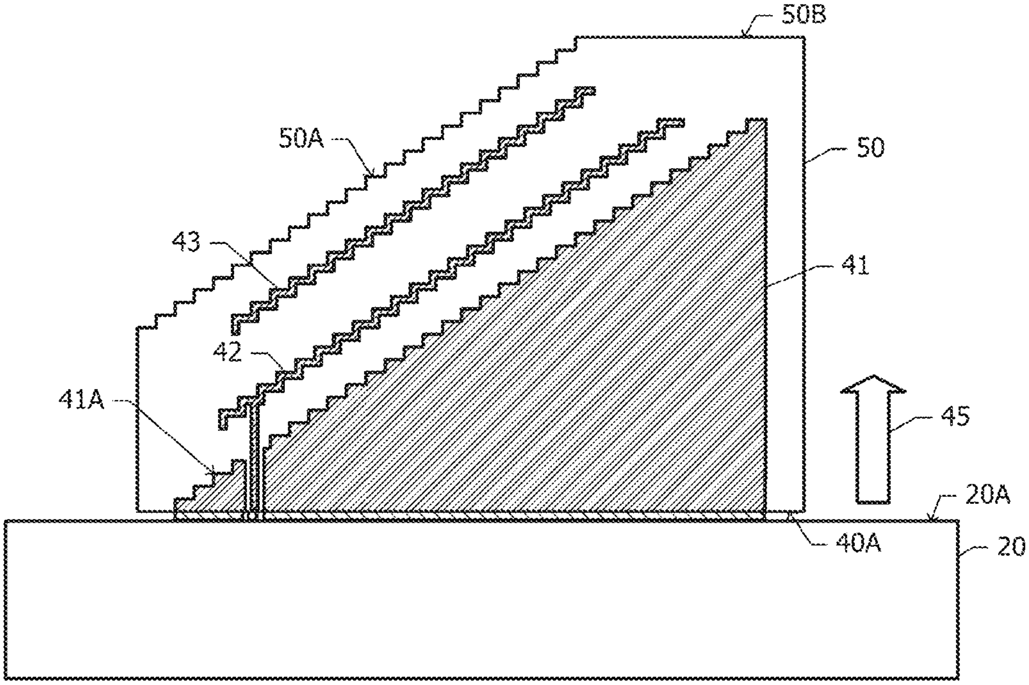
FIG. 21 is a cross-sectional diagram of an antenna device according to a ninth example.

FIG. 21 is a cross-sectional diagram of the antenna device according to the ninth example. In the second example (FIG. 4), the antenna ground surface 41A, a surface of the feed element 42, and a surface of the parasitic element 43 are configured with substantially flat surfaces. On the other hand, in the ninth example, the antenna ground surface 41A, the surface of the feed element 42, and the surface of the parasitic element 43 have stepped shapes. A tread of the surface in the stepped shape is parallel to the substrate ground surface 20A, and a riser of the surface is perpendicular to the substrate ground surface 20A. Here, the "stepped shape" does not mean a geometrically strict stepped shape, and a wavy surface of which a boundary between a tread and a riser is not clear is included in the surface in the "stepped shape".

Next, excellent effects of the ninth example will be described.

In a case where the dielectric block 40 is modeled by using a 3D printer, when a stack direction 45 is set in a vertical direction with respect to the substrate ground surface 20A, depending on a resolution of the 3D printer, a surface inclined with the substrate ground surface 20A has a stepped shape, in some cases. In the ninth example, since the surface inclined with respect to the substrate ground surface 20A is formed in a stepped shape, a high resolution is not required for the 3D printer for modeling the dielectric block 40.

Further, since the antenna ground surface 41A, the surface of the feed element 42, and the surface of the parasitic element 43 have the stepped shapes, close contact between the dielectric which is a material of the dielectric member 50 and the metal which is a material of the feed element 42 or the like at these stepped surfaces is increased. Thus, separating at an interface surface is less likely to occur.

Since the feed element 42 and the parasitic element 43 have the stepped shapes, a path of a current that flows in a direction of ascending and descending the stairs is lengthened. As the conductive path becomes longer, a resonant frequency is decreased. Conversely, when the resonant frequency is the same, the dimensions of the feed element 42 and the parasitic element 43 in the plan view are reduced in the stepped shapes. Therefore, the dielectric block 40 can be made smaller.

Next, an antenna device according to a modification example of the ninth example will be described. In the ninth example, the dielectric member 50 is formed of a single dielectric material. Meanwhile, the dielectric member 50 may be formed of a plurality of dielectric materials having different dielectric constants. In a case where an interface surface of different dielectric materials is parallel to the antenna ground surface 41A, the interface surface between the dielectric members has a stepped shape. Therefore, close contact at the interface surface of different dielectric materials can be improved.

Tenth Example

Next, an antenna device according to a tenth example will be described with reference to FIG. 22A. Hereinafter, a configuration in common with the antenna device according to the ninth example described with reference to FIG. 21 will not be described.

Figure 22A:
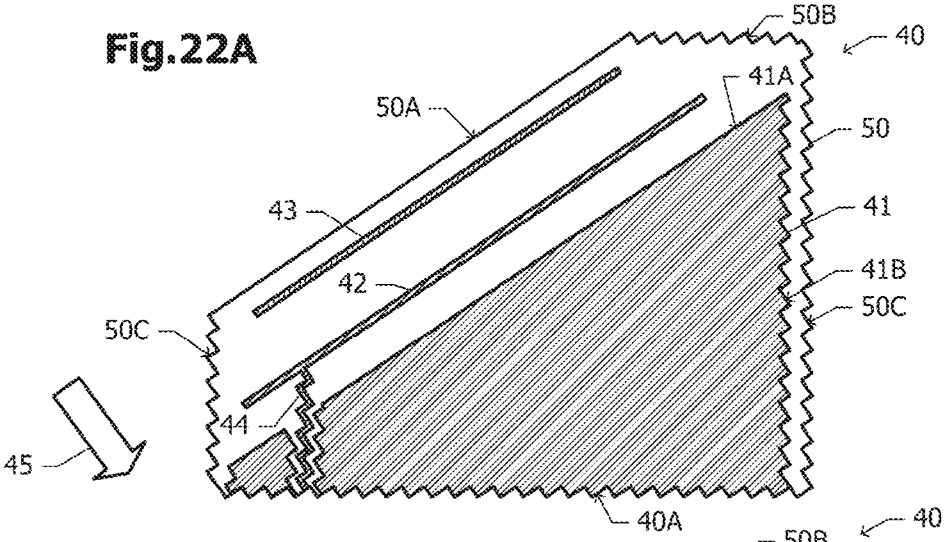
FIG. 22A is a cross-sectional diagram of an antenna device according to a tenth example.

FIG. 22A is a cross-sectional diagram of the antenna device according to the tenth example. In the ninth example (FIG. 21), the surface inclined with respect to the bottom surface 40A of the dielectric block 40 has a stepped shape. On the other hand, in the tenth example, the antenna ground surface 41A, a surface of the feed element 42, and a surface of the parasitic element 43 are flat, and a surface inclined with respect to these surfaces has the stepped shape. For example, the top surface 50B and the side surfaces 50C of the dielectric member 50 and the bottom surface 40A (the surface along the substrate ground surface 20A) of the dielectric block 40 have the stepped shapes. Further, the side surface 41B of the ground member 41 and a surface of the feed line 44 have the stepped shapes. The stepped surface is configured with a tread parallel to and a riser vertical to the antenna ground surface 41A.

Next, excellent effects of the tenth example will be described.

In a case where the dielectric block 40 is modeled by using a 3D printer, when the stack direction 45 is set in a vertical direction with respect to the antenna ground surface 41A, depending on a resolution of the 3D printer, a surface inclined with the antenna ground surface 41A has a stepped shape, in some cases. In the tenth example, since the surface inclined with respect to the antenna ground surface 41A has the stepped shape, a high resolution is not required for the 3D printer for modeling the dielectric block 40.

In addition, in the tenth example, since the antenna ground surface 41A, the surface of the feed element 42, and the surface of the parasitic element 43 are flat, an increase in loss due to these shapes can be reduced. Further, in the same manner as the ninth example, close contact between the dielectric and the metal is increased at the stepped interface surface, and separating is less likely to occur.

Figure 22B:
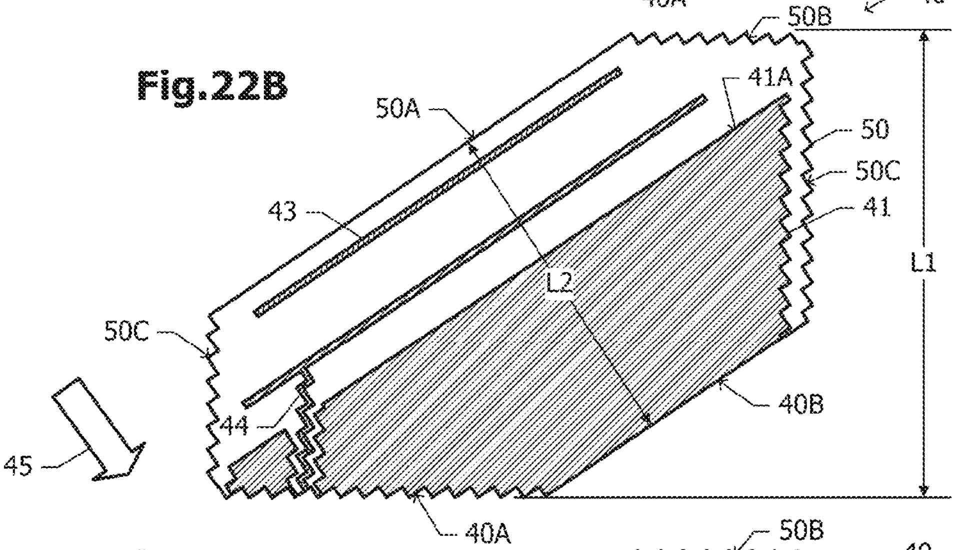
FIG. 22B is a cross-sectional diagram of an antenna device according to a modification example of the tenth example.

Next, an antenna device according to a modification example of the tenth example will be described with reference to FIG. 22B. FIG. 22B is a cross-sectional diagram of the antenna device according to the modification example of the tenth example. In the tenth example (FIG. 22A), the bottom surface 40A of the dielectric block 40 and the side surface 50C of the dielectric member 50 are in succession with a ridge interposed therebetween. On the other hand, in the present modification example, the bottom surface 40A and the side surface 50C are connected to each other with an inclined surface 40B interposed therebetween and parallel to the antenna ground surface 41A.

A dimension L2 of the dielectric block 40 in a direction (stack direction 45) perpendicular to the antenna ground surface 41A is smaller than a dimension L1 in a direction perpendicular to the substrate ground surface 20A. Since a dimension in the stack direction 45 is reduced, the number of times of stacking when modeling using a 3D printer is reduced, and a manufacturing cost can be reduced.

Figure 22C:
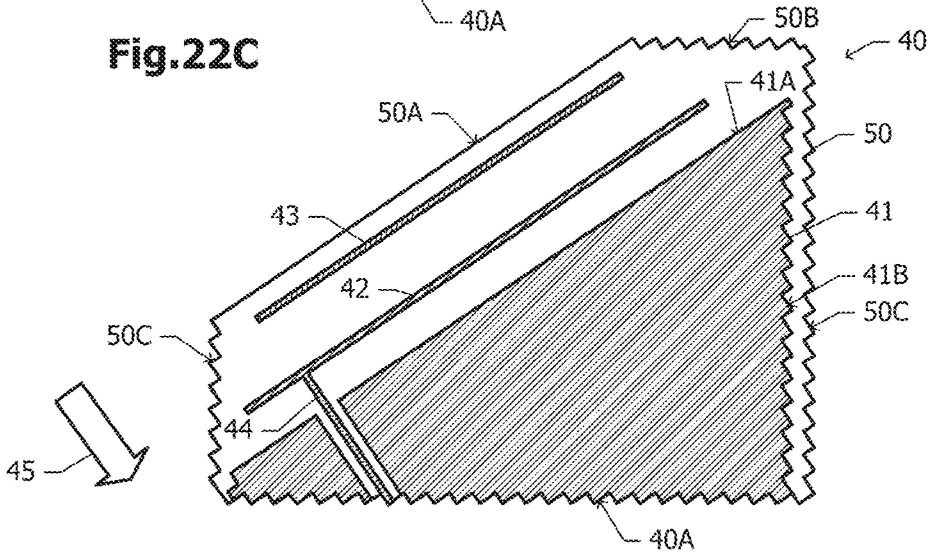
FIG. 22C is a cross-sectional diagram of an antenna device according to another modification example of the tenth example.

Next, an antenna device according to another modification example of the tenth example will be described with reference to FIG. 22C. FIG. 22C is a cross-sectional diagram of the antenna device according to the other modification example of the tenth example. In the present modification example, the feed line 44 extends in a direction parallel to the stack direction 45 when the dielectric block 40 is modeled by using a 3D printer. Therefore, the feed line 44 is inclined with respect to the bottom surface 40A of the dielectric block 40. A surface of the feed line 44 does not have a stepped shape, but has a substantially flat surface. By flattening the surface of the feed line 44, a transmission loss can be reduced, as compared with the feed line 44 in the stepped shape.

Next, still another modification example of the tenth example will be described. In the antenna devices illustrated in FIGS. 22A, 22B, and 22C, the dielectric member 50 is provided with the top surface 50B in the stepped shape. Meanwhile, the top surface 50B is not necessarily provided in the same manner as the first example (FIG. 1A). In a case where each layer in the stack direction 45 is stacked and modeled from the inclined surface 50A by using a 3D printer, when the inclined surface 50A is enlarged, the antenna device can be more stably supported in the middle of the modeling stage.

Eleventh Example

Next, an antenna device according to an eleventh example will be described with reference to FIG. 23. Hereinafter, a configuration in common with the antenna device according to the first example described with reference to FIGS. 1A to 3C will not be described.

Figure 23:
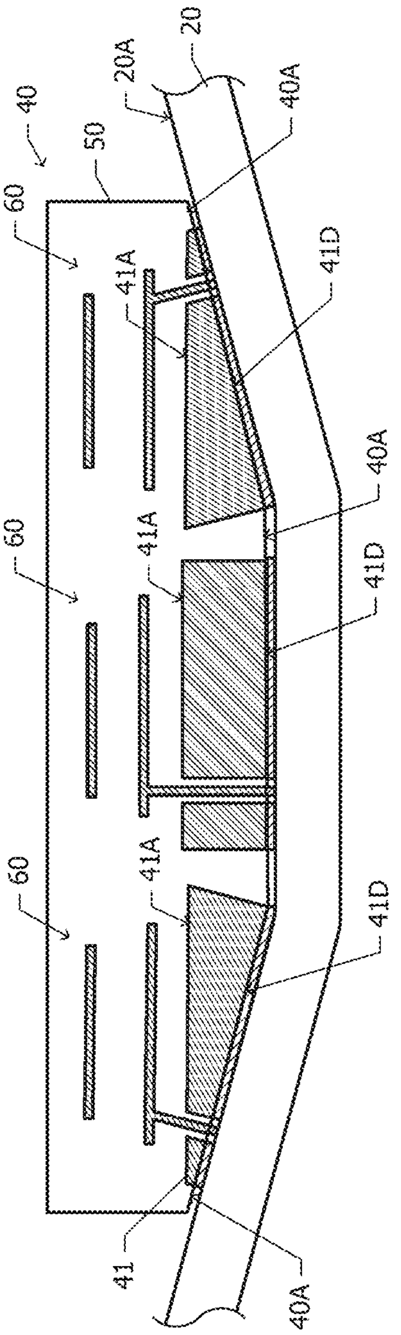
FIG. 23 is a cross-sectional diagram of an antenna device according to an eleventh example.

FIG. 23 is a cross-sectional diagram of the antenna device according to the eleventh example. In the first example (FIG. 1A), one patch antenna including the antenna ground surface 41A, the feed element 42, and the parasitic element 43 is built in one dielectric member 50. On the other hand, in the eleventh example, the plurality of patch antennas 60 are built in one dielectric member 50. As the substrate 20 of the antenna device, the substrate 20 that is bent according to a shape of a location at which the dielectric block 40 is mounted in a communication device is used. The plurality of ground members 41 are respectively mounted on flat regions of the substrate ground surface 20A.

The antenna ground surfaces 41A of the plurality of patch antennas 60 are located on a common virtual plane, or are parallel to each other. The bottom surface 41D of the ground member 41 included in each of the plurality of patch antennas 60 is inclined with respect to the antenna ground surface 41A according to a shape of the substrate 20. When focusing on each of the plurality of patch antennas, the antenna ground surface 41A is inclined with respect to the bottom surface 40A of a region in which the ground member 41 of the patch antenna is provided. The patch antenna 60 (the patch antenna 60 at a center in FIG. 23) of which the bottom surface 41D of the ground member 41 is parallel to the antenna ground surface 41A is built, in some cases.

Next, excellent effects of the eleventh example will be described. Also in a case where the substrate 20 is bent according to the shape of the location at which the dielectric block 40 is to be mounted, and mounted on a communication device, the directions of the main beams of the plurality of patch antennas can be aligned.

Next, a modification example of the eleventh example will be described.

In the eleventh example, the directions of the main beams of the plurality of patch antennas 60 are the same. Meanwhile, the direction of the main beams may be different for each patch antenna 60. The dielectric block 40 (FIGS. 1A, 4, and the like) including a single patch antenna may be mounted in each of a plurality of flat regions of a substrate having a bending portion.

In the present modification example, the main beam can be directed in a direction inclined from a normal direction of each of the plurality of flat regions. Thus, a wider coverage is achieved, as compared with a configuration in which the plurality of dielectric blocks 40 are mounted on a common plane and a configuration in which a patch antenna in the related art is mounted in each of a plurality of flat regions of a bent substrate.

Figure 4:
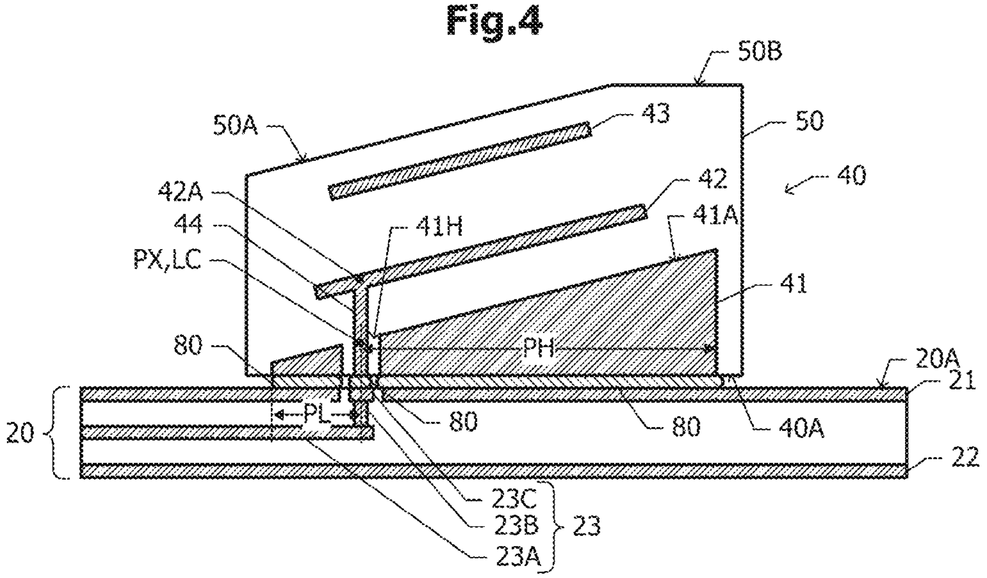
FIG. 4 is a cross-sectional diagram of an antenna device according to a second example.

For example, the dielectric blocks 40 may be mounted on flat regions on both sides of a bent portion of a substrate bent in an L-shape at a right angle, respectively. In a configuration in which the patch antennas in the related art are disposed in two flat regions, the directions of the two main beams form an angle of 90°. On the other hand, as described with reference to FIG. 5A, in the dielectric block 40 (FIG. 1A and FIG. 4) used in the present modification example, the main beam can be inclined by approximately ±45° from a normal direction of the substrate ground surface 20A (FIGS. 1A and 4). Therefore, a coverage angle can be expanded from 90° to 180°.

As another configuration, the dielectric block 40 may be mounted in each of three flat regions of a substrate bent in a trapezoidal shape. Alternatively, the dielectric block 40 may be mounted on each of four inclined surfaces of a substrate bent along four side surfaces of a square pyramid and on an upper surface. In this manner, the dielectric block 40 may be freely mounted in each of the plurality of flat regions of the bent substrate.

Twelfth Example

Next, an antenna device according to a twelfth example will be described with reference to FIG. 24A. Hereinafter, a configuration in common with the antenna device according to the first example described with reference to FIGS. 1A to 3C will not be described.

Figure 24A:
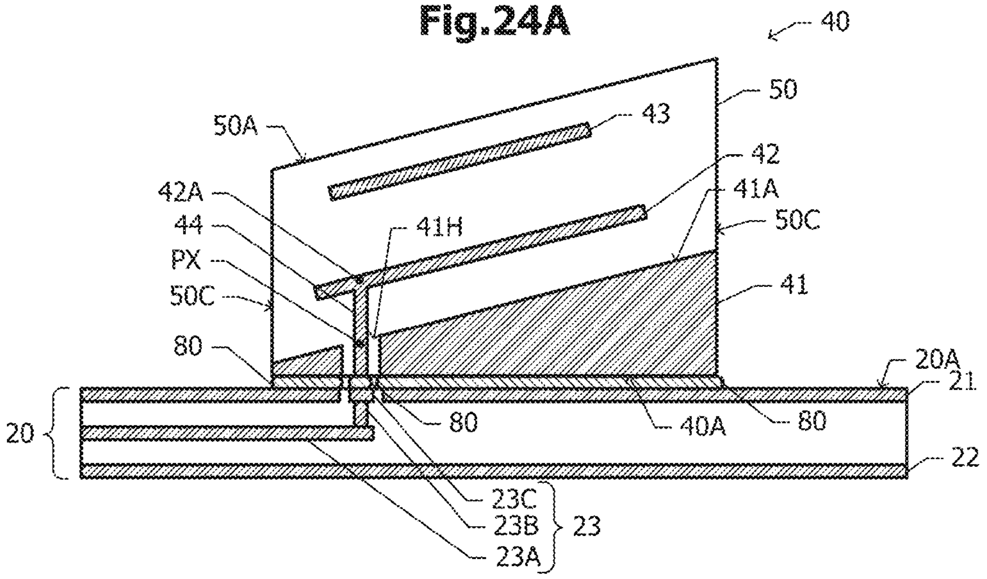
FIG. 24A is a cross-sectional diagram of antenna device according to a twelfth example.

FIG. 24A is a cross-sectional diagram of the antenna device according to the twelfth example. In the first example (FIG. 1A), a side surface of the ground member 41 is covered with the dielectric member 50. On the other hand, in the twelfth example, the side surface of the ground member 41 is exposed. Thus, the ground member 41 is exposed to the entire region of the bottom surface 40A of the dielectric block 40.

Next, excellent effects of the twelfth example will be described. In the same manner as the first example, in the twelfth example as well, an excellent effect that a ground potential of the antenna ground surface 41A is stabilized is obtained.

Figure 24B:
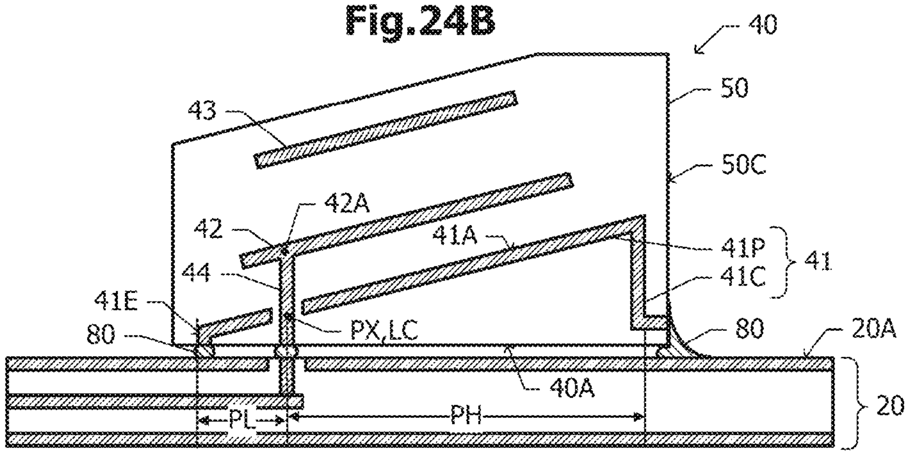
FIG. 24B is a cross-sectional diagram of an antenna device according to a modification example of the twelfth example.

Next, an antenna device according to a modification example of the twelfth example will be described with reference to FIG. 24B. FIG. 24B is a cross-sectional diagram of the antenna device according to the modification example of the twelfth example.

In the present modification example, in the same manner as the antenna device (FIG. 13A) according to the fifth example, the ground member 41 includes the plate-shaped conductor member 41P and the connection member 41C. The connection member 41C is exposed to the side surface 50C of the dielectric member 50 at a lower end of the connection member 41C. An exposed location of the connection member 41C is connected to the substrate ground surface 20A with the solder layer 80 interposed therebetween. In the same manner as the present modification example, the ground member 41 may be exposed to a side surface of the dielectric member 50, and a location exposed to the side surface may be connected to the substrate ground surface 20A with the solder layer 80 interposed therebetween. The ground member 41 may be exposed to the bottom surface 40A of the dielectric block 40 or the side surface 50C of the dielectric member 50 on both the side PL lower of the contour line LC and the side PH higher of the contour line LC.

Thirteenth Example (Reference Example)

Next, an antenna device according to a thirteenth example (reference example) will be described with reference to FIG. 25. Hereinafter, a configuration in common with the antenna device according to the first example described with reference to FIGS. 1A to 3C will not be described.

Figure 25:
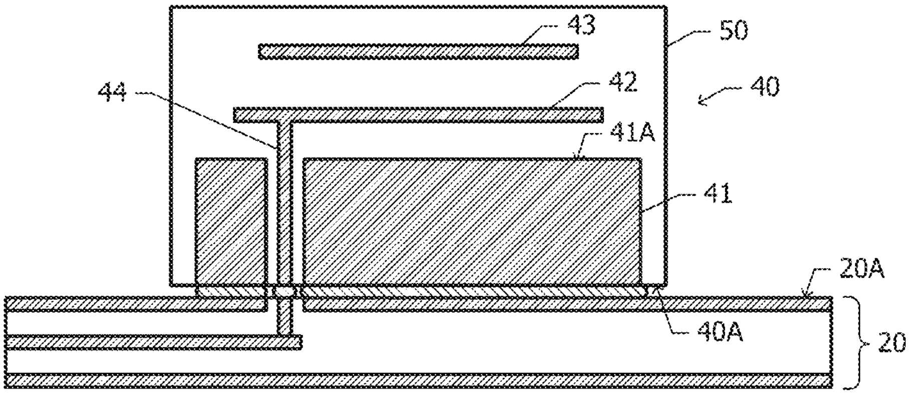
FIG. 25 is a cross-sectional diagram of an antenna device according to a thirteenth example (reference example).

FIG. 25 is a cross-sectional diagram of the antenna device according to the thirteenth example (reference example).

In the first example (FIG. 1A), the antenna ground surface 41A is inclined with respect to the bottom surface 40A of the dielectric block 40. On the other hand, in the thirteenth example (reference example), the antenna ground surface 41A is parallel to the bottom surface 40A of the dielectric block 40. A direction of a main beam of a patch antenna configured with the antenna ground surface 41A, the feed element 42, and the parasitic element 43 is perpendicular to the bottom surface 40A of the dielectric block 40.

Next, excellent effects of the antenna device according to the thirteenth example (reference example) will be described.

By mounting the dielectric block 40 of the antenna device according to the first example and the dielectric block 40 of the antenna device according to the thirteenth example (reference example) in a mixed manner on the common substrate 20, a main beam of each of a plurality of patch antennas can be directed in a direction perpendicular to or an inclined direction with respect to the substrate ground surface 20A. In this manner, by mixing the dielectric block 40 according to the first example and the dielectric block 40 according to the eighth example on one substrate, an excellent effect of increasing the degree of freedom in selecting the directional characteristics of the antenna device is obtained.

Fourteenth Example

Next, an antenna device according to a fourteenth example will be described with reference to FIGS. 26A, 26B, and 27. Hereinafter, a configuration in common with the antenna device according to the first example described with reference to FIGS. 1A to 3C will not be described.

Figure 26A:
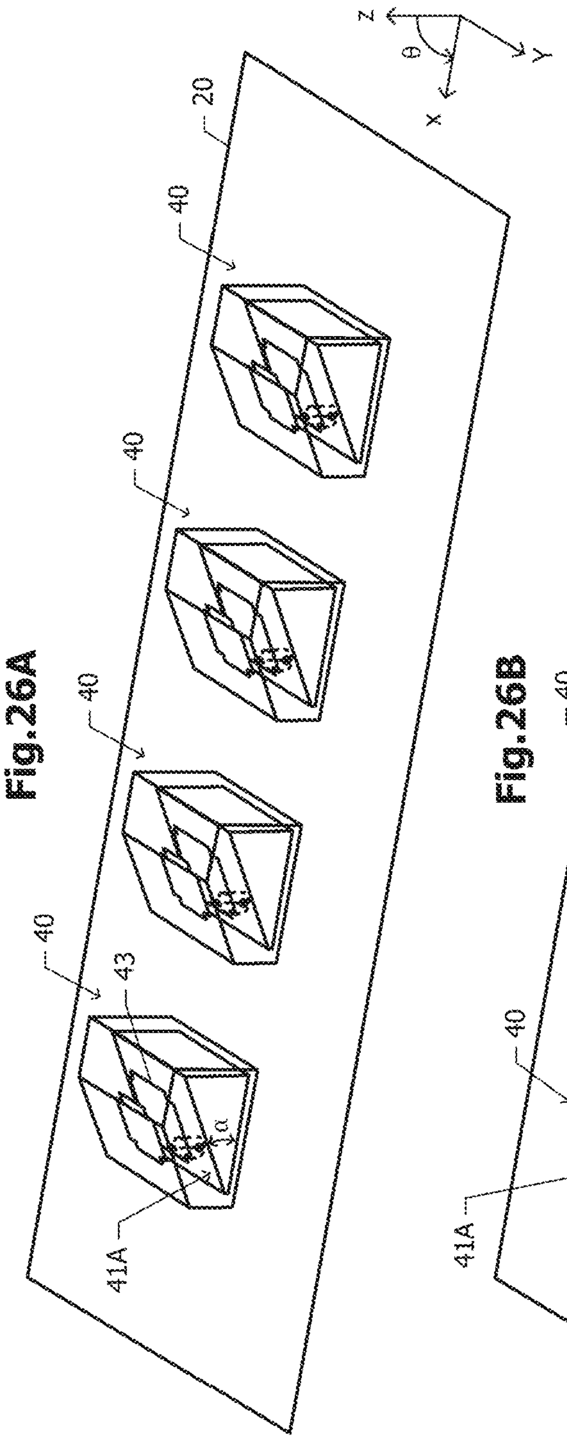
FIG. 26A is a perspective view of antenna device according to a fourteenth example.
Figure 26B:
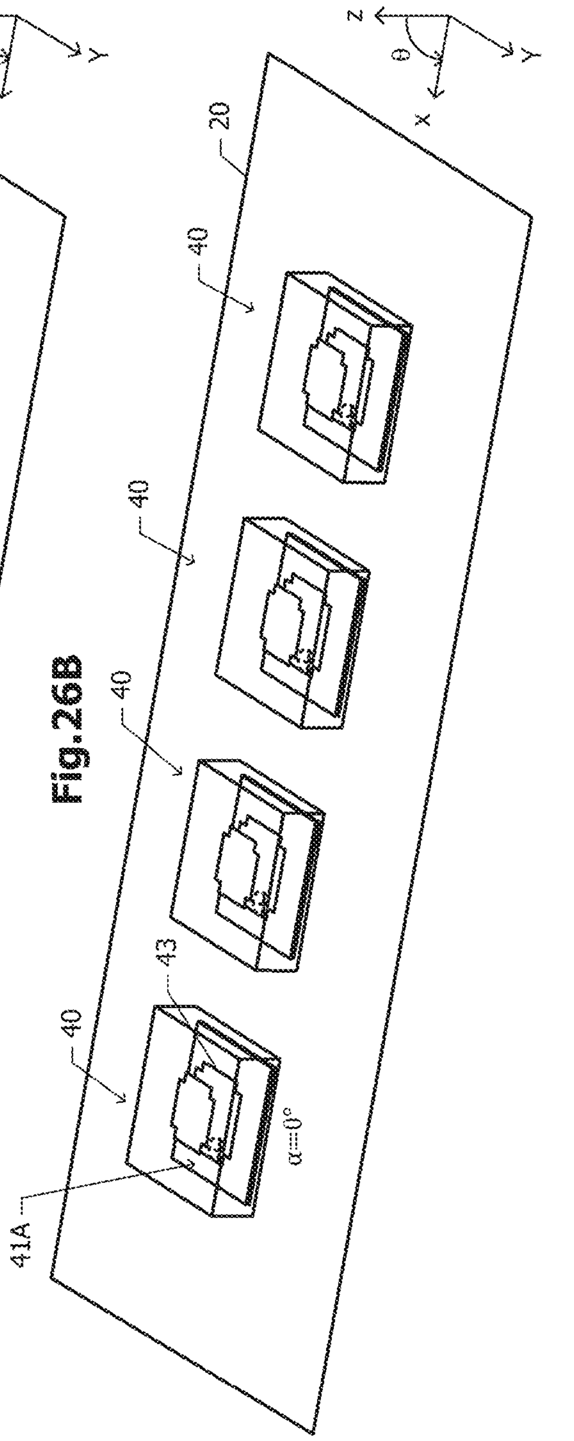
FIG. 26B is a perspective view of an antenna device according to a comparative example.

FIGS. 26A and 26B are perspective views of the antenna devices according to the fourteenth example and the comparative example, respectively. The four dielectric blocks 40 are disposed side by side in a row on the substrate 20. Each of the four dielectric blocks 40 of the antenna device (FIG. 26A) according to the fourteenth example has the same configuration as the dielectric block 40 of the antenna device according to the first example.

An xyz orthogonal coordinate system is defined in which a direction in which the four dielectric blocks 40 are disposed is the x-direction and a normal direction of the substrate 20 is the z-direction. A direction in which a surface, on which the dielectric block 40 is disposed, of the substrate 20 faces is defined as a positive direction of the z-axis. An outward normal line of the antenna ground surface 41A according to the fourteenth example faces a direction in which a vector facing in the positive direction of the z-axis is inclined in the positive direction of the x-axis. An inclination angle of the antenna ground surface 41A with respect to the xy plane is labeled as a. The inclination angle $\alpha$ of the antenna ground surface 41A of the antenna device according to the comparative example with respect to the xy plane is 0°.

Figure 27:
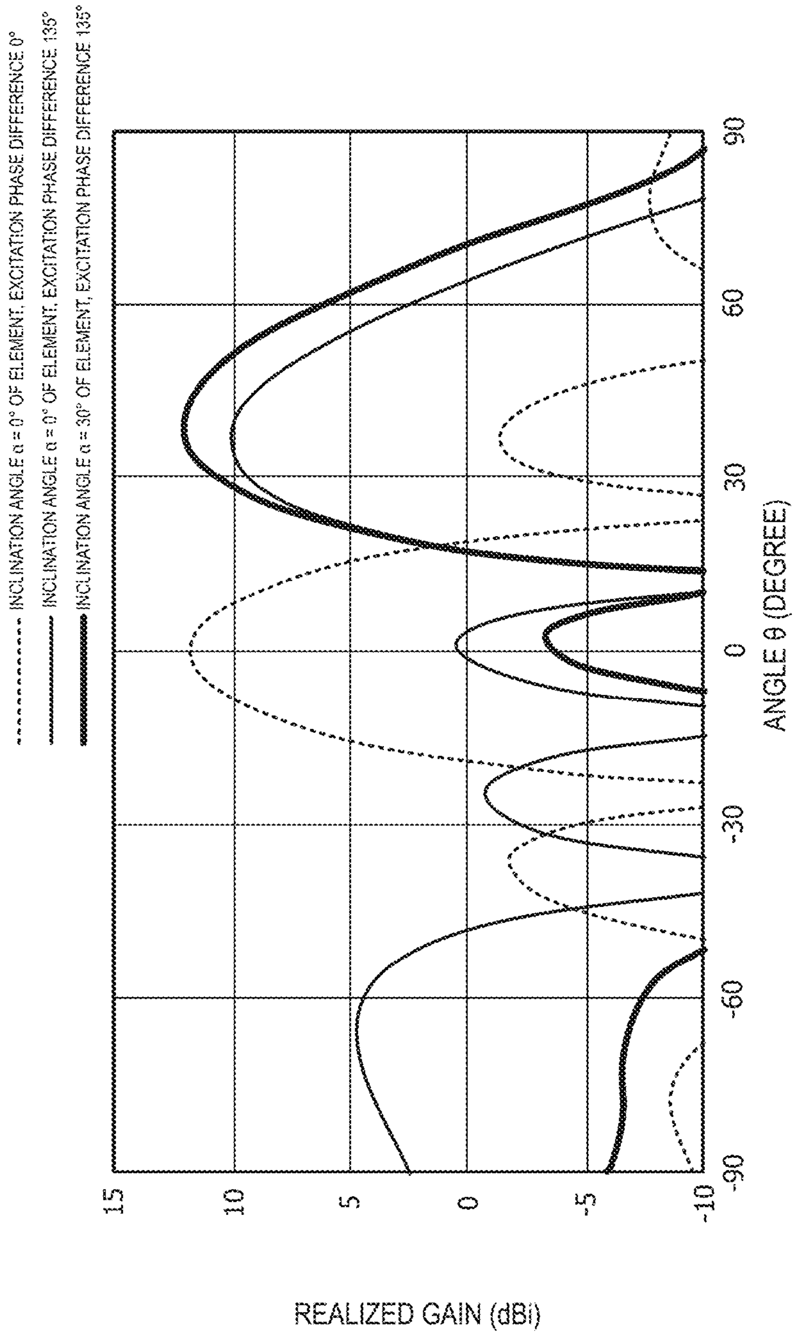
FIG. 27 is a graph illustrating a simulation result of a radiation pattern when the antenna devices according to the fourteenth example (FIG. 26A) and the comparative example (FIG. 26B) are operated as a phased array.

FIG. 27 is a graph illustrating a simulation result of a radiation pattern when the antenna devices according to the fourteenth example (FIG. 26A) and the comparative example (FIG. 26B) are operated as a phased array. An interval between the feed elements 42 in the x-direction (distance between centers) is set to 3 mm, and a frequency of an excitation signal is set to 60 GHz. The inclination angle $\alpha$ of the antenna ground surface 41A of the antenna device (FIG. 26A) according to the fourteenth example is set to 30°.

A horizontal axis of a graph in FIG. 27 represents the angle $\theta$ inclined from the positive direction of the z-axis toward the positive direction of the x-axis in a unit "°", and a vertical axis represents a realized gain in a unit "dBi".

A broken line in the graph of FIG. 27 indicates a radiation pattern in a case where the four feed elements 42 of the antenna device (FIG. 26B) according to the comparative example are excited in-phase.

A thin solid line and a thick solid line in the graph of FIG. 27 indicate radiation patterns when the four feed elements 42 of the antenna devices according to the comparative example (FIG. 26B) and the fourteenth example (FIG. 26A) are excited with a phase difference of 135°, respectively. A phase of the excitation signal is delayed by 135° from the feed element 42 on the positive side of the x-axis toward the feed element 42 on the negative side of the x-axis.

It can be seen that when the four feed elements 42 are excited in-phase, the realized gain is maximum in the front direction ($\theta$=0°). When excited with a phase difference of 135°, a main lobe appears in the vicinity of the angle θ=40° in any of the antenna devices of the fourteenth example and the comparative example. In the antenna device according to the comparative example, a grating lobe appears in the vicinity of the angle θ=−60°. Meanwhile, no grating lobe appears in the antenna device according to the fourteenth example.

Next, excellent effects of the fourteenth example will be described.

As illustrated in FIG. 27, when the inclination angle α of the antenna ground surface 41A is set to 0°, a grating lobe is generated when a beam is swung over a wide angle. On the other hand, in the fourteenth example, even when a beam is swung over a wide angle from the positive direction of the z-axis to the direction in which the normal line of the antenna ground surface 41A faces, no grating lobe is generated.

Next, a modification example of the fourteenth example will be described.

In the fourteenth example, the four dielectric blocks 40 constitute a phased array antenna. Meanwhile, the number of dielectric blocks 40 may be a plurality other than four. As a condition for the simulation illustrated in FIG. 27, the inclination angle α of the antenna ground surface 41A is 30°. Meanwhile, the inclination angle α of the antenna ground surface 41A may be set to another angle.

Each example described above is an example, and it goes without saying that partial replacement or a combination of configurations illustrated in different examples is possible. The same operation and effect by the same configuration of a plurality of examples will not be sequentially referred to for each example. Further, the present is not limited to the examples described above. For example, it will be obvious to a person skilled in the art that various modifications, improvements, combinations, and the like are possible.

REFERENCE SIGNS LIST

20 Substrate
20A Substrate ground surface
21 First ground conductor
22 Second ground conductor
23 Feed line
23A Strip line
23B Via-conductor
23C Land
40 Dielectric block
40A Bottom surface of dielectric block 40
40B Inclined surface of dielectric block 40
41 Ground member
41A Antenna ground surface
41B Side surface of ground member
41C Connection member
41CF Framing structure
41CH Convex hull
41D Bottom surface of ground member
41E Lowermost edge
41F Uppermost edge
41H Through-hole
41P Plate-shaped conductor member
42 Feed element
42A Feed point
43 Parasitic element
44 Feed line
45 Stack direction
50 Dielectric member
50A Inclined surface of dielectric member
50B Top surface of dielectric member
50C Side surface of dielectric member
55 Cavity
56 Circuit element
57 Connector
60 Patch antenna
80 Solder layer
LC Contour line
PX Intersection point
PH Higher side of contour line
PL Lower side of contour line

The invention claimed is:

1. An antenna device comprising:
a dielectric block including a bottom surface,
wherein the dielectric block includes
a conductive ground member including an antenna ground surface inclined with respect to the bottom surface,
a feed element that is disposed at a distance from the antenna ground surface, and constitutes a patch antenna together with the antenna ground surface,
a feed line connected to a feed point of the feed element, and
a dielectric member that supports the feed element with respect to the ground member and in which the feed element is embedded, wherein
the ground member is exposed to the bottom surface, on both a lower side and a higher side of a contour line on the antenna ground surface passing through an intersection point of a perpendicular line drawn from the feed point to a virtual plane including the bottom surface and a plane including the antenna ground surface, by using the bottom surface as a height reference, and
wherein the antenna ground surface and a surface of the feed element have stepped shapes.

2. The antenna device according to claim 1,
wherein the feed line intersects the antenna ground surface from the feed point, and extends toward the bottom surface, and insulation between the feed line and the antenna ground surface is ensured at an intersection location between the feed line and the antenna ground surface, and
the ground member includes a part that surrounds the feed line between the bottom surface and the antenna ground surface.

3. The antenna device according to claim 2,
wherein the ground member includes
a plate-shaped conductor member of which one surface is the antenna ground surface, and
a plurality of columnar connection members extending from the plate-shaped conductor member toward the bottom surface, and
the plurality of connection members are disposed at intervals in a peripheral direction around the feed line.

4. The antenna device according to claim 2,
wherein the ground member includes
a plate-shaped conductor member of which one surface is the antenna ground surface, and
a cylindrical connection member that extends from the plate-shaped conductor member toward the bottom surface, and
the feed line passes through an inside of the cylindrical connection member.

5. The antenna device according to claim 2,
wherein the ground member includes
a plate-shaped conductor member of which one surface is the antenna ground surface, and a connection member that extends from an edge of the plate-shaped conductor member toward the bottom surface.

6. The antenna device according to claim 1, wherein the ground member is configured with a conductor lump.

7. The antenna device according to claim 1, wherein the bottom surface is provided with a recess portion.

8. The antenna device according to claim 1, wherein the dielectric member includes an inclined surface parallel to the feed element at a position farther from the feed element when viewed from the antenna ground surface.

9. The antenna device according to claim 1, wherein the dielectric member includes a top surface parallel to the bottom surface at a position higher than the feed element, by using the bottom surface as a height reference.

10. The antenna device according to claim 1, wherein the dielectric member includes a top surface that is parallel to the bottom surface and includes the antenna ground surface when the bottom surface is viewed in a plan view.

11. An antenna device comprising:

a dielectric block including a bottom surface, wherein the dielectric block includes a conductive ground member including an antenna ground surface inclined with respect to the bottom surface, a feed element that is disposed at a distance from the antenna ground surface, and constitutes a patch antenna together with the antenna ground surface, a feed line connected to a feed point of the feed element, and a dielectric member that supports the feed element with respect to the ground member and in which the feed element is embedded, wherein the ground member is exposed to the bottom surface, on both a lower side and a higher side of a contour line on the antenna ground surface passing through an intersection point of a perpendicular line drawn from the feed point to a virtual plane including the bottom surface and a plane including the antenna ground surface, by using the bottom surface as a height reference, wherein the antenna ground surface and a surface of the feed element are flat, and the bottom surface includes a stepped shape.

12. The antenna device according to claim 11, wherein a dimension of the dielectric block in a direction perpendicular to the antenna ground surface is smaller than a dimension of the dielectric block in a direction perpendicular to the bottom surface.

13. The antenna device according to claim 1, wherein a plurality of feed elements are supported and arrayed at the dielectric member, and the feed line is disposed for each of the feed elements.

14. The antenna device according to claim 1, further comprising:

a substrate including a substrate ground surface, wherein the dielectric block is mounted on the substrate in a posture in which the bottom surface faces the substrate, and a part of the ground member exposed to the bottom surface is electrically connected to the substrate ground surface.

15. The antenna device according to claim 14, wherein the substrate includes a bending portion, and the ground member is mounted on a flat region of the substrate.

16. A communication module comprising:

the antenna device according to claim 7; and a substrate including a substrate ground surface, wherein the dielectric block is mounted on the substrate in a posture in which the bottom surface faces the substrate, a part of the ground member, exposed to the bottom surface is electrically connected to the substrate ground surface, and the communication module further comprises:

a circuit element supported by the substrate and accommodated in the recess portion.

17. The communication module according to claim 16, wherein the circuit element is a high-frequency integrated circuit element that supplies power to the feed line, and the communication module further comprises:

a connector connected to the high-frequency integrated circuit element.

18. An antenna device comprising:

a dielectric member including a bottom surface and a side surface;

a conductive ground member that is provided at the dielectric member and includes an antenna ground surface inclined with respect to the bottom surface;

a feed element that is embedded in the dielectric member, is disposed at a distance from the antenna ground surface, and constitutes a patch antenna together with the antenna ground surface; and a feed line connected to a feed point of the feed element, wherein the ground member is exposed to the bottom surface or the side surface, on both a lower side and a higher side of a contour line passing through an intersection point of a perpendicular line drawn from the feed point to a virtual plane including the bottom surface and a plane including the antenna ground surface, by using the bottom surface as a height reference, wherein the antenna ground surface and a surface of the feed element have stepped shapes, or are flat, and the bottom surface includes a stepped shape.

19. The antenna device according to claim 1, wherein the dielectric member is formed of a plurality of different dielectric materials of different dielectric constants.

* * * * *